US009228819B2

(12) United States Patent
Pruitt et al.

(10) Patent No.: US 9,228,819 B2
(45) Date of Patent: *Jan. 5, 2016

(54) POWER ACTUATED WHEEL CLAMP

(71) Applicant: SNAP-ON INCORPORATED, Kenosha, WI (US)

(72) Inventors: Carl W. Pruitt, Conway, AR (US); Brian K. Gray, Conway, AR (US); David Cox, Hartland, WI (US)

(73) Assignee: SNAP-ON INCORPORATED, Kenosha, WI (US)

( * ) Notice: Subject to any disclaimer, the term of this patent is extended or adjusted under 35 U.S.C. 154(b) by 146 days.

This patent is subject to a terminal disclaimer.

(21) Appl. No.: 14/064,008

(22) Filed: Oct. 25, 2013

(65) Prior Publication Data

US 2014/0115906 A1 May 1, 2014

Related U.S. Application Data

(60) Provisional application No. 61/719,113, filed on Oct. 26, 2012.

(51) Int. Cl.
    *G01B 5/255* (2006.01)
(52) U.S. Cl.
    CPC .................................. *G01B 5/255* (2013.01)
(58) Field of Classification Search
    CPC ...... G01B 11/275; G01B 21/26; G01B 5/255; G01B 7/315
    USPC ...................................................... 33/203.18
    See application file for complete search history.

(56) References Cited

U.S. PATENT DOCUMENTS

| 1,971,702 | A | * | 8/1934 | Burgan | 33/336 |
|---|---|---|---|---|---|
| 2,479,912 | A | * | 8/1949 | Desy | 33/560 |
| 2,627,123 | A | * | 2/1953 | Taber | 33/336 |
| 3,775,936 | A | * | 12/1973 | Pepmeier et al. | 53/136.3 |
| 3,869,798 | A | * | 3/1975 | Wilkerson | 33/264 |
| 3,990,666 | A | * | 11/1976 | Morrison et al. | 248/205.1 |
| 4,335,519 | A | * | 6/1982 | Alsina | 33/288 |
| 4,377,038 | A |   | 3/1983 | Ragan | |
| 4,823,470 | A | * | 4/1989 | Horvallius | 33/228 |
| 5,048,192 | A | * | 9/1991 | Pascoal | 33/203.18 |

(Continued)

OTHER PUBLICATIONS

Search Report and Written Opinion of the International Searching Authority issued in International Patent Application No. PCT/US2012/054270 dated Sep. 7, 2012.

(Continued)

*Primary Examiner* — Christopher Fulton
(74) *Attorney, Agent, or Firm* — McDermott Will & Emery LLP

(57) ABSTRACT

A wheel clamp attaches to a vehicle wheel for performing a wheel alignment on the vehicle. The wheel clamp has a body for supporting a target or measuring head, and three elongated arms mounted to the body. Each arm has a gripping portion for gripping the tire's tread surface. A self-centering linkage has enmeshed gears that, when rotated, cause the elongated arms to simultaneously proportionally move relative to the clamp body. An attachment interface mechanically connected to the self-centering linkage is configured to engage with a rotational actuator. Alternatively, the wheel clamp includes an actuator mechanically coupled to the self-centering mechanism. Activation of the actuator causes the gripping portions of the arms to engage and grip the tire tread surface and tighten the clamp onto the tire.

16 Claims, 24 Drawing Sheets

(56) References Cited

U.S. PATENT DOCUMENTS

| | | | |
|---|---|---|---|
| 5,056,231 A * | 10/1991 | Alusick et al. | 33/203.18 |
| 5,987,761 A * | 11/1999 | Ohnesorge | 33/203.18 |
| 6,131,293 A | 10/2000 | Maioli et al. | |
| 6,708,419 B2 | 3/2004 | Corghi | |
| 7,703,212 B2 | 4/2010 | Stieff et al. | |
| 7,810,244 B2 * | 10/2010 | Stieff et al. | 33/203.18 |
| 7,870,677 B2 | 1/2011 | Gray et al. | |
| 7,930,834 B2 | 4/2011 | Stieff et al. | |
| 8,033,028 B2 | 10/2011 | Stieff et al. | |
| 2011/0001821 A1 | 1/2011 | Stieff et al. | |
| 2014/0070474 A1 * | 3/2014 | Gray et al. | 269/156 |

OTHER PUBLICATIONS

"ProClamp SYNCRO" <www.haweka.com/en/indexphp?nav=5.81.126.132> Retrieved from the Internet on Oct. 17, 2012 (1 page).

"Magnetic Wheel Adapter TC-142" truckCam—Effective Driving Wheel Alignment Systems <www.truckcam.com> Retrieved from the Internet on Oct. 17, 2012 (2 pages).

"Wheel Adapter for rims 14"-24"TC-175 Spider" truckCam—Effective Driving Wheel Alignment Systems <www.truckcam.com> Retrieved from the Internet on Oct. 17, 2012 (2 pages).

"HawkEye Elite Alignment System—Greater profit and productivity through innovation" <http://www.hunter.com/alignment/hawkeye_elite/features.cfm> Retrieved from the Internet on Sep. 7, 2012.

Alignment Accessories—Hunter Engineering Company. "QuickGrip Adaptor Accesories" and Wheel-Off Adjustment Kits. pp. 3-5 (Retrieved from the Internet on Sep. 7, 2012).

HawkEye Elite HE421 Series Sensors—Hunter Engineering Company, pp. 1-3 (Copyright 2011). Retrieved from the Internet on Sep. 7, 2012.

"The unique self-centering 3-point Syncro clampers from FASEP—The secret of success, the secret of a good wheel alignment." <http://fasep.it/english/support/tech_talks/tt015_self_centering_clampers.asp> Retrieved from the Internet on Sep. 7, 2012.

"Beissbarth KDS 3D wheel aligner" <http://www.beissbarth.com/tryit/index.php?ID=2&SUB1=164&LG=E&CS=1> Retrieved from the Internet on Sep. 7, 2012.

"ProClamp PLUS" <http://hawkeka.com/en/index.php?nav=5.81.126.245> Retrieved from the Internet on Jul. 16, 2012 (3 pages).

"Atlas Fast Clamp Three Point 13"-24" Non-Runout Wheel Clamps (Set of 4)" <http://www.gregsmithequipment.com/Atlas-Fast-Clamp-Three-Point-13-24-Non-Runout-Wheel-Clamps-Set-Of-4> Retrieved from the Internet on Sep. 6, 2012.

"Atlas Fastclamp Wheel Clamps" <http://www.atlasautoequipment.com/products/fastclamp>. Retrieved from the Internet on Sep. 6, 2012.

CARTEK—A Heritage of Excellence 2011—Equipment Catalog, pp. 6-8.

"The World's First Bluetooth Truck Alignment System" Ravaglioli HD, 5 pages (Apr. 1, 2012).

"TD2200WS (8CCD) Bluetooth" Ravaglioli, 4 pages (Mar. 1, 2012).

"TD1760WS (6CCD) Bluetooth Series" Ravaglioli, 4 pages (Mar. 1, 2011).

* cited by examiner

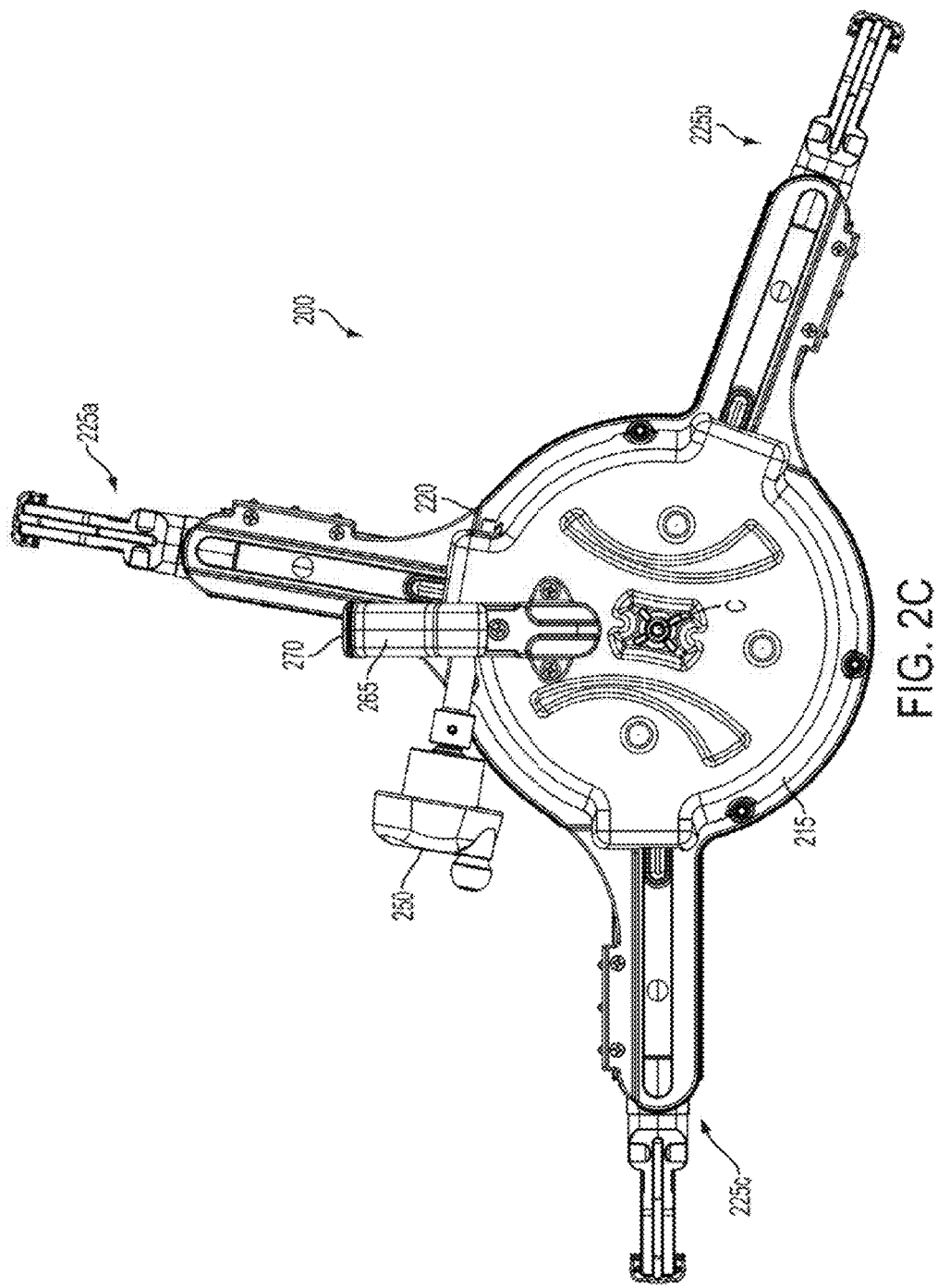

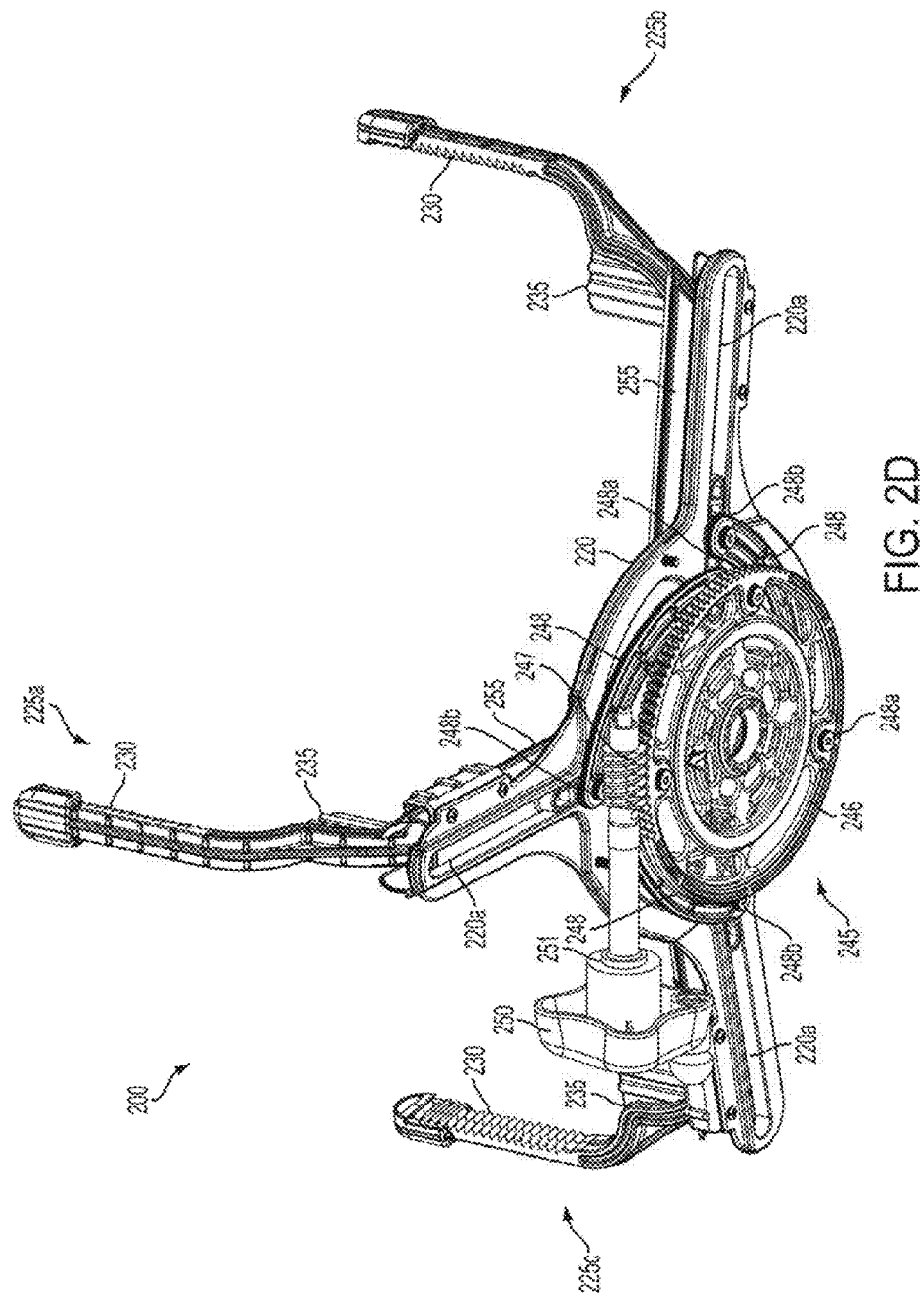

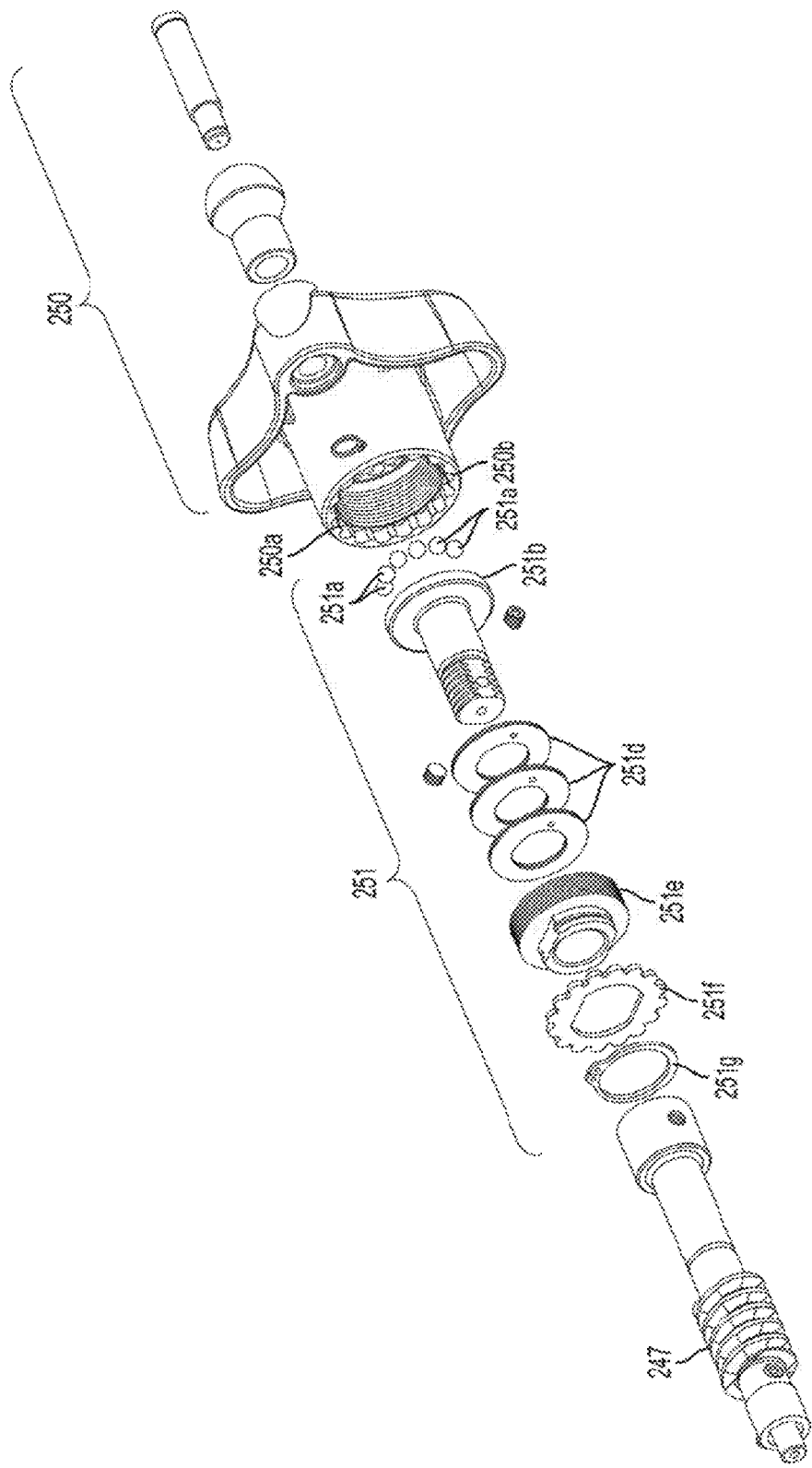

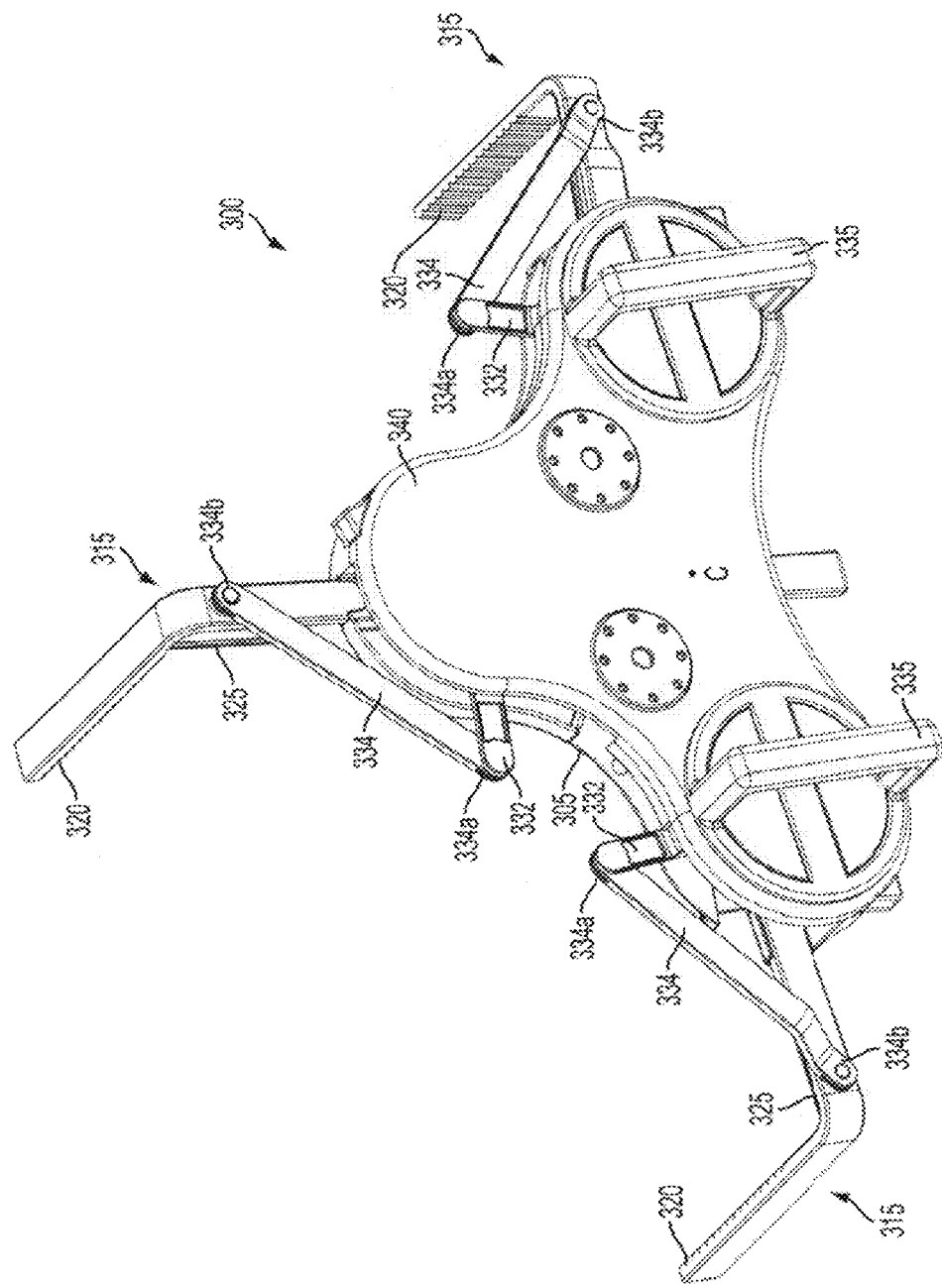

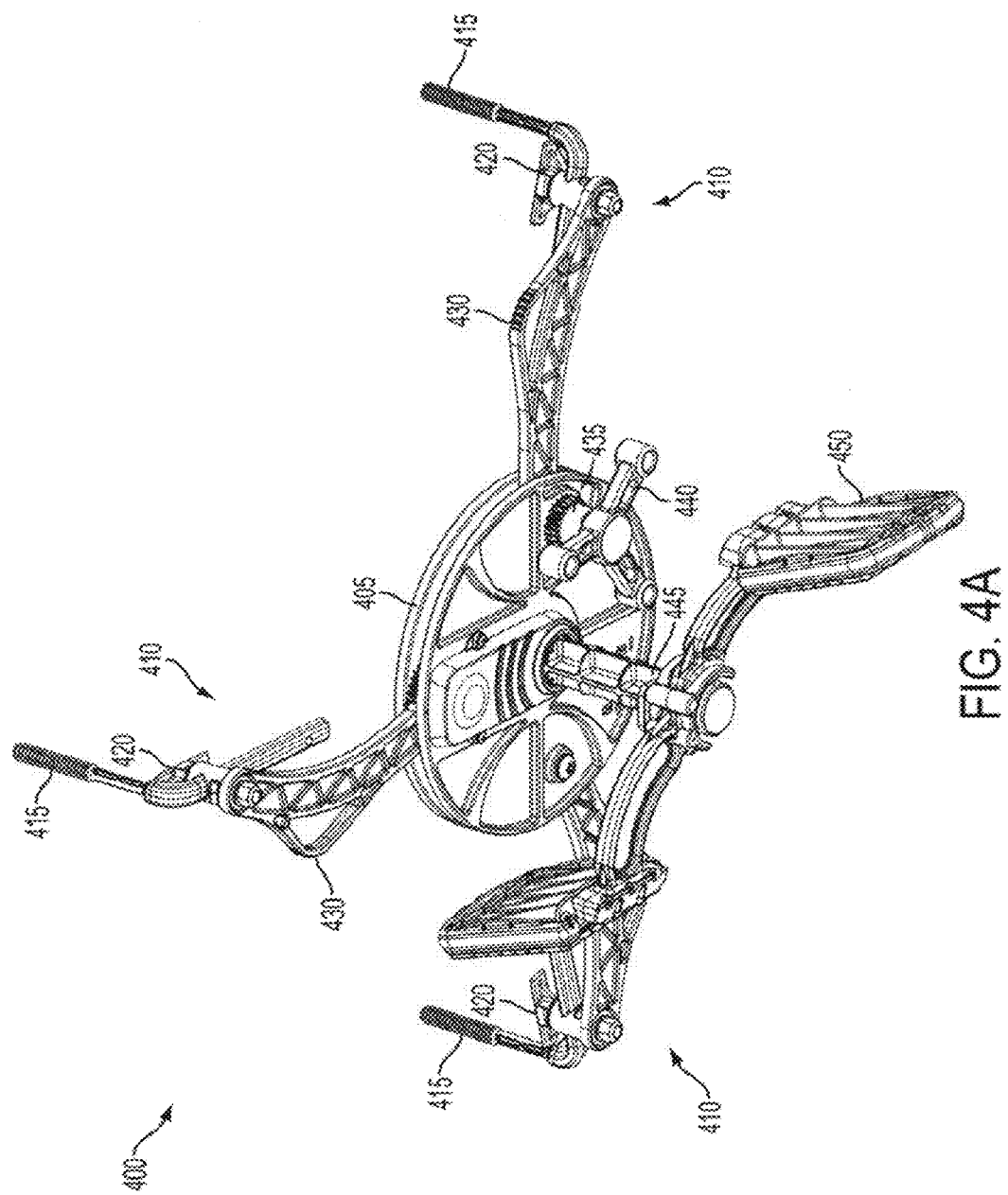

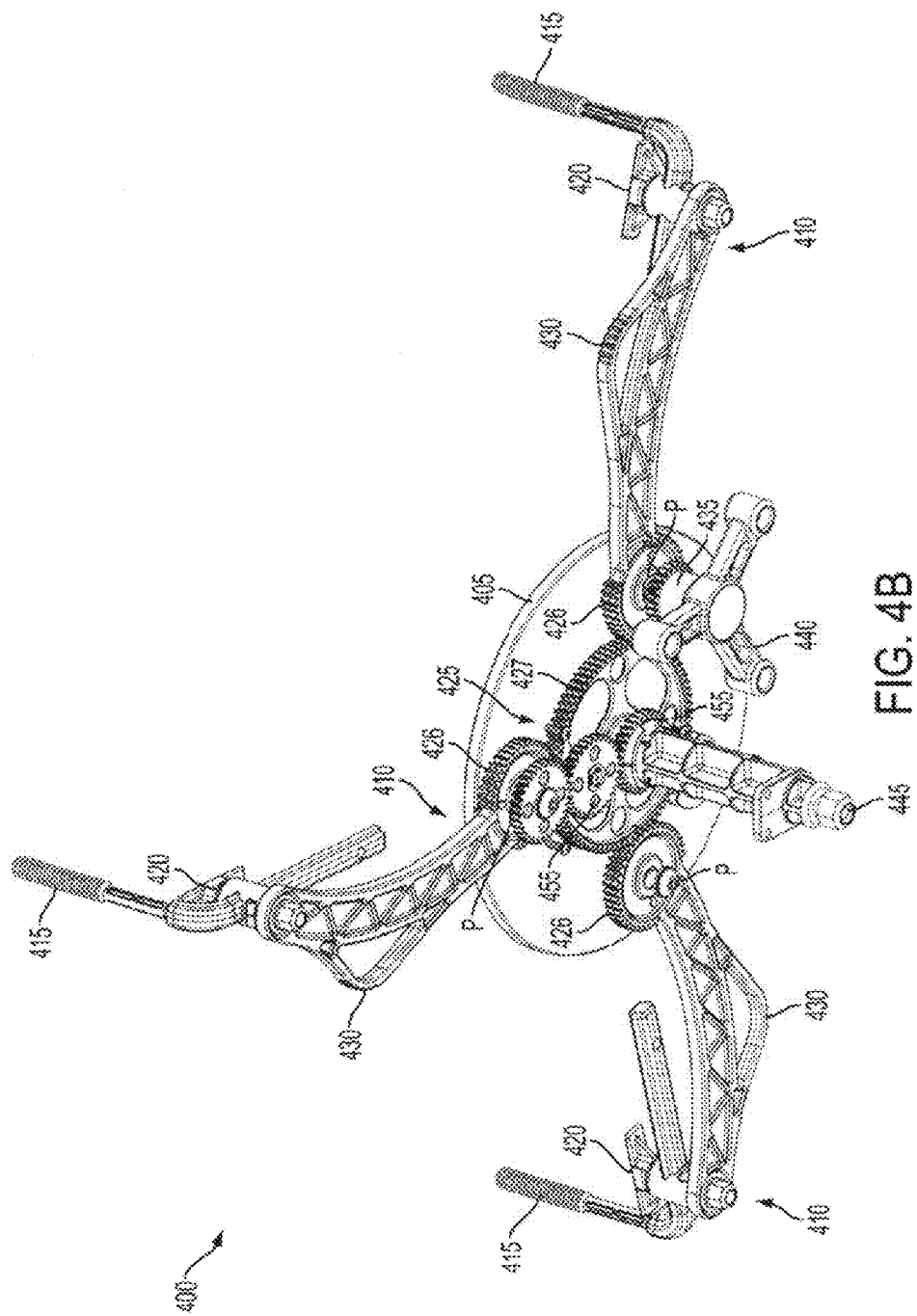

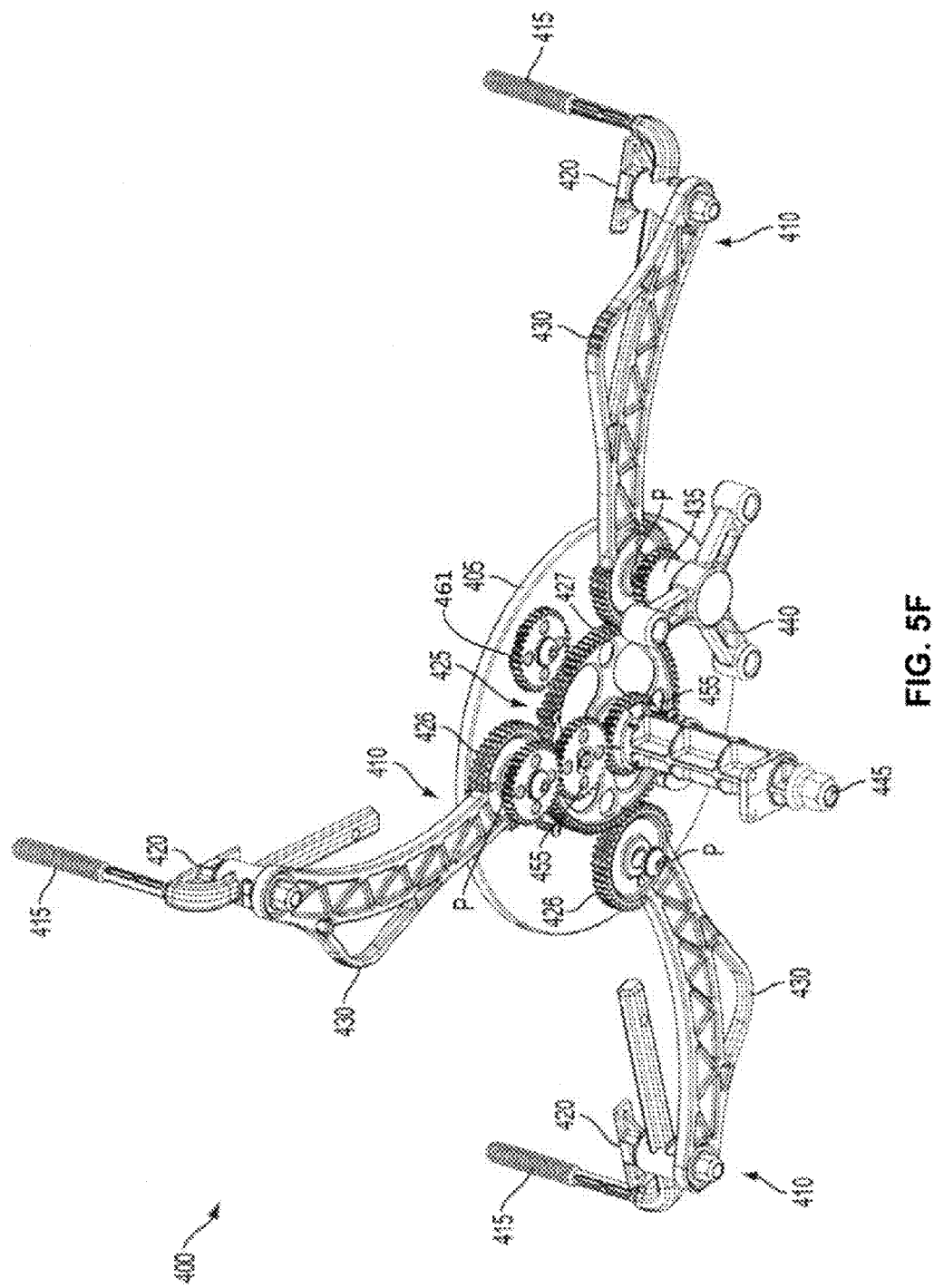

POWER ACTUATED WHEEL CLAMP

CROSS-REFERENCE TO RELATED APPLICATION

This application claims the benefit of U.S. Provisional Application No. 61/719,113, filed on Oct. 26, 2012, the disclosure of which is incorporated herein in its entirety.

TECHNICAL FIELD

The present subject matter relates to equipment for aligning vehicle wheels. It has particular applicability to wheel clamps for attaching wheel alignment equipment to the wheels.

BACKGROUND

Certain conventional vehicle wheel alignment systems use alignment elements referred to as "alignment heads" that are attached to the wheels of a vehicle to measure various angles of the wheels and suspension. These angles are communicated to a host computer system, where they are used in the calculation of vehicle alignment angles. In a standard conventional aligner configuration, four alignment heads are attached to respective wheels of a vehicle. Each alignment head comprises two horizontal or toe measurement sensors and two vertical or camber/pitch sensors. Each alignment head also contains electronics to support overall sensor data acquisition as well as communications with the aligner console, local user input, and local display for status feedback, diagnostics and calibration support. Other conventional alignment systems, referred to as "visual aligners," use optical targets attached to each vehicle wheel instead of sensors. The targets are imaged by cameras, and these visual images are used to calculate the vehicle wheel alignment angles.

Such alignment equipment usually includes a wheel clamp that attaches to a vehicle's wheel and carries the alignment element (i.e., the sensor equipment that measures the alignment angles, or the optical target). Referring now to FIG. 1, a conventional wheel clamp 100, such as described in U.S. Pat. No. 7,870,677, includes a pair of upper and lower sliding brackets 105, 110, respectively, for engaging the rim of the vehicle wheel, and a center bracket 115 for holding an alignment element, such as an optical target or an alignment head. Brackets 105, 110, 155 are all slidably mounted on a pair of guide bars 120, 125. A lead screw 130 threadingly engages upper and lower brackets 105, 110 for clamping the clamp 100 to the vehicle wheel. The vehicle being aligned is usually positioned on a vehicle alignment lift at heights from three to four feet for performing alignments. The vehicle can be raised even higher, up to six feet, for servicing the vehicle from underneath.

Attachment of the wheel clamp to the vehicle wheel is typically accomplished using a set of three or more gripping devices or grabbers which are part of the wheel clamp. The grabbers wedge thin metal fingers in the annular groove between the tire and the wheel rim at several locations around the wheel circumference. The grip is tightened by means of a screw thread driver or similar means that pulls the grabbers toward the wheel center. In an alternative methodology, used particularly on steel wheels, the grabbers are removed and the grabber supports are located against the inner surface of the steel wheel. The grabber supports are driven outward from the wheel center until they lock the wheel clamp in place. Either method requires metal to metal contact between the wheel clamp and the vehicle wheel rim, so some damage to the surface of the wheel is inevitable.

Speed of attachment is another critical aspect of wheel clamp functionality. Aligning the metal fingers of conventional wheel clamps into the small annular space between the wheel rim and tire is a challenge that requires precise placement. Once the grabbers are positioned properly, care must be taken to prevent one or more grabbers from popping out as the clamp is tightened. This process takes considerable time and care to prevent unnecessary damage to the rim surface.

Additionally, wheel clamps are typically manually operated, and require an operator to supply the actuation power by either rotating a knob, operating a cam, or some other manual operation to secure the clamp onto a wheel. A need exists for an improvement to the automotive service wheel clamp to improve speed of engagement and process efficiency. This need is especially pronounced because tires and rims come in a wide variety of sizes, such that adjustment of a wheel clamp onto wheels at the extremities of the size range can be time consuming.

SUMMARY

The concepts disclosed herein alleviate the above noted problems with conventional wheel clamps.

According to the present disclosure, a wheel clamp is for being attached to a vehicle wheel for performing a wheel alignment on the vehicle, the wheel comprising a tire and a rim. The wheel clamp includes a clamp body for supporting an apparatus used in performing the wheel alignment; three elongated arms, each mounted to the clamp body such that they extend outward from the clamp body, each elongated arm having a gripping portion for gripping a tread surface of the vehicle tire; a self-centering linkage mechanism comprising a plurality of gears rotatably mounted to the clamp body and engaged with each other, and connecting to the elongated arms such that when the gears are rotated, the elongated arms simultaneously proportionally move relative to the clamp body; and an attachment interface mechanically connected to the self-centering linkage mechanism and configured to be releasably engaged with a rotational actuator. When the rotational actuator is engaged with the attachment interface, activation of the rotational actuator causes the linkage mechanism to move the elongated arms to cause the gripping portions of the elongated arms to engage and grip the tire tread surface and tighten the clamp onto the tire.

According to another aspect of the present disclosure, a wheel clamp comprises a clamp body; three elongated arms, each mounted to the clamp body such that they extend outward from the clamp body, each elongated arm having a gripping portion for gripping a tread surface of the vehicle tire; a self-centering mechanism comprising a plurality of gears rotatably mounted to the clamp body and engaged with each other, and connecting to the elongated arms such that when the gears are rotated, the elongated arms simultaneously proportionally move relative to the clamp body; a control interface configured to receive a command from an operator of the wheel clamp to tighten or release the wheel clamp; and an actuator mechanically coupled to the self-centering mechanism and configured to power the self-centering mechanism in response to the command received by the control interface to move the elongated arms such that the gripping portions of the arms engage and grip the tire tread surface and tighten the clamp onto the tire based on the operator command to tighten the wheel clamp.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 2B, 2C, and 2E are external views of the wheel clamp of FIG. 2A.

FIGS. 2D and 2F are cutaway views of the wheel clamp of FIG. 2A.

FIG. 2H is an exploded view of the clutch mechanism of FIG. 2G.

FIGS. 3A and 3B are external views of a wheel clamp according to another embodiment of the present disclosure.

FIG. 4A is an external view of a wheel clamp according to a further embodiment of the present disclosure.

FIG. 4B is a cutaway view of the wheel clamp of FIG. 4A.

FIGS. 5C-5F show attachment interfaces and related elements mounted on the wheel clamps of FIGS. 2A, 2C, and 4A respectively.

DETAILED DESCRIPTION

Reference now is made in detail to the examples illustrated in the accompanying drawings and discussed below. FIGS. 2A-2H illustrate an embodiment of a wheel clamp according to the present disclosure for attaching to a vehicle wheel for performing a wheel alignment on the vehicle. According to this embodiment, the wheel clamp includes three extendable arms with gripping devices at the extremity of each arm, for gripping the vehicle tire tread surface when the arms are pulled inward using a rotating worm gear rotating in a first direction while engaging an orbital gear with pivotable and slidable linkages to each of the three arms. An important advantage of the worm gear is its nature to lock in place when tightened, ensuring a secure grip on the tire is maintained without additional locking elements. In certain embodiments, an automatic clutch mechanism is provided to allow only a predetermined maximum torque on the worm gear as the clamp is tightened. This provides consistent clamp tightness across all four clamps used on a typical vehicle application, ensures that all clamps are stable and secure, and minimizes target position variation due to tire deformation caused by clamp tightness variation. The gripping devices are disengaged from the tire tread surface by rotating the handle attached to the worm gear in a second and opposite direction.

Figure 1:
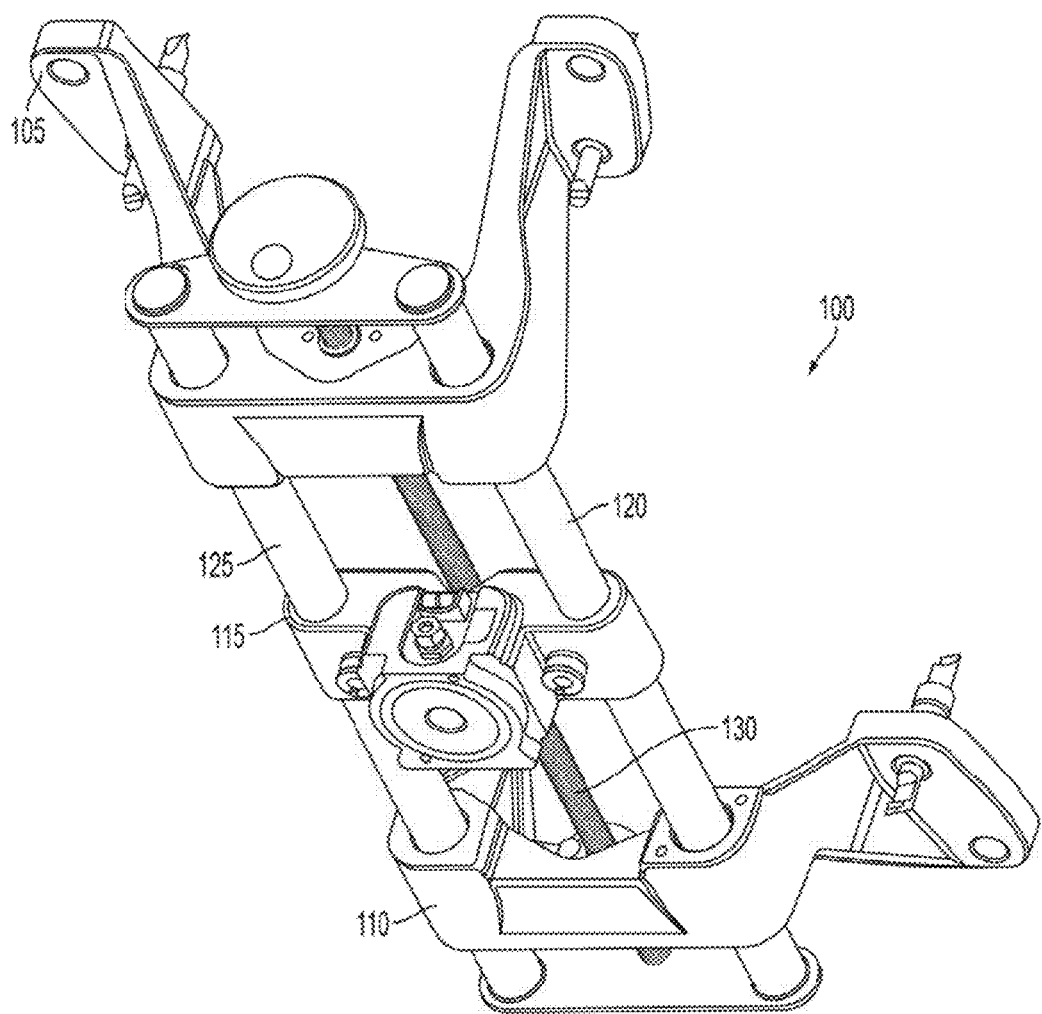
FIG. 1 is a prior art wheel clamp.
Figure 2A:
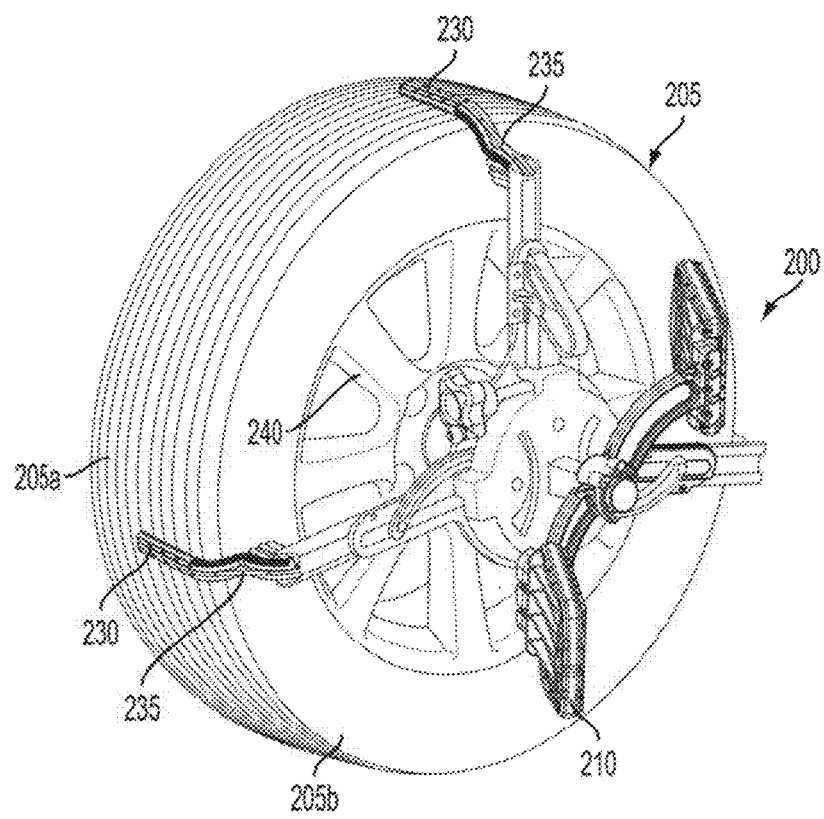
FIG. 2A is wheel clamp according to an embodiment of the present disclosure mounted on a vehicle wheel.

FIG. 2A shows a clamp assembly 200 according to this embodiment mounted on a vehicle tire 205, while not touching the rim 240 on which the tire 205 is mounted. As used herein, the term "vehicle wheel" refers to the combination of tire 205 and rim 240. An exemplary optical target 210 is shown attached to the clamp 200, which target 210 is used in performing a wheel alignment.

Figure 2B:
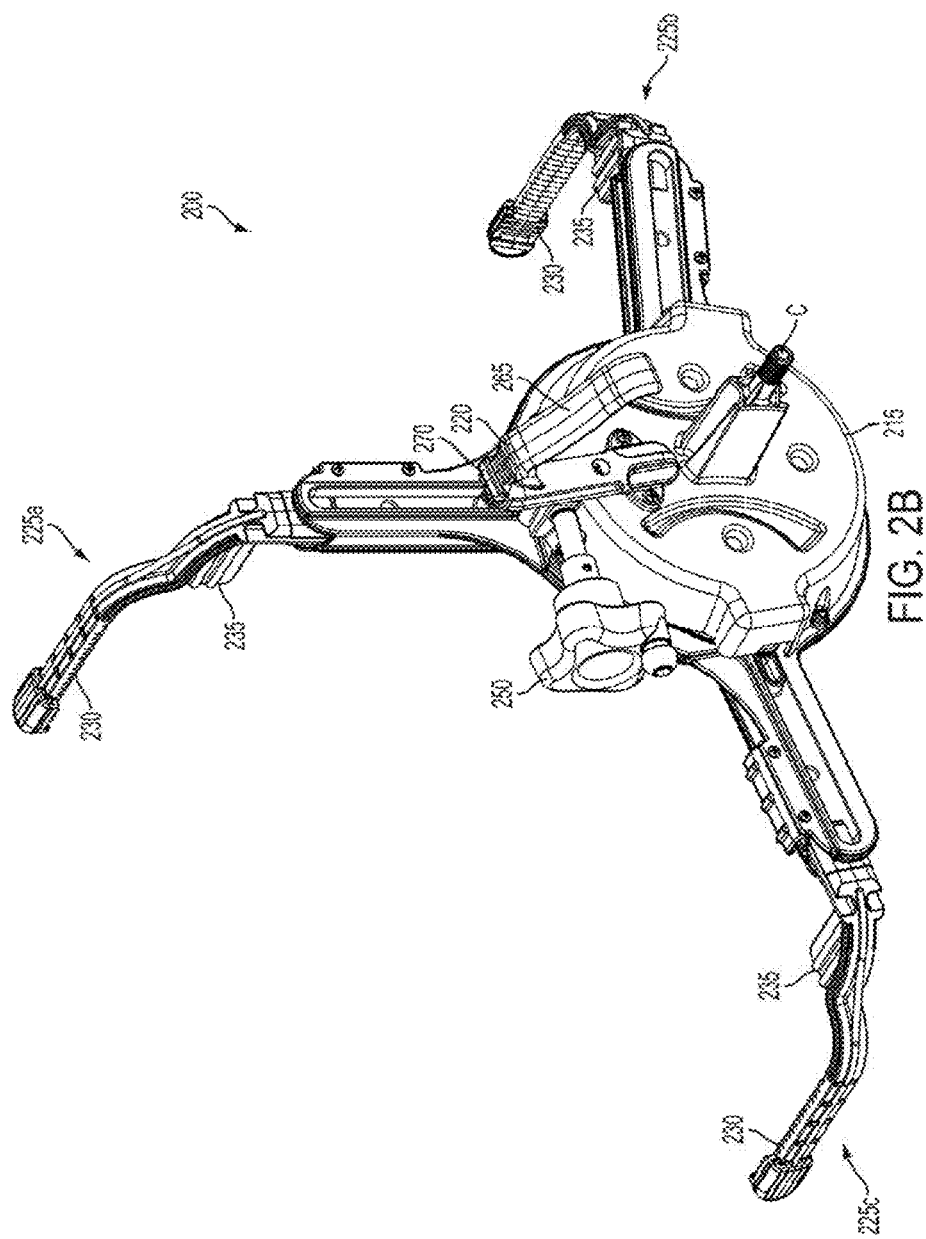

The disclosed clamp 200 of this embodiment is shown without a target in FIGS. 2B and 2C including a gear cover 215 used to protect the gears and linkages. FIG. 2D shows the clamp 200 without the gear cover 215. The wheel clamp 200 comprises a clamp body 220 for supporting an apparatus used in performing the wheel alignment. For example, the clamp body 220 of FIGS. 2A-F includes gear cover 215 for supporting the target 210 at a central point C.

Three extendable arms 225a-c, each slidably mounted to the clamp body 220, extend outward radially from the central point C. Each extendable arm 225a-c has a gripping portion 230 for gripping a tread surface 205a of the vehicle tire 205, and a sidewall contact portion 235 for contacting a sidewall 205b of the tire 205 when the gripping portion 230 is gripping the tire tread surface 205a. The extendable arms 225a-c are for spacing the wheel clamp 200 away from the wheel rim 240 when the gripping portions 230 are gripping the tire tread surface 205a and the sidewall contact portions 235 are contacting the tire sidewall 205b, such that the clamp body 220 is substantially parallel to the vehicle wheel and the wheel clamp 200 has no contact with the rim 240. A first one of the extendible arms 225b is spaced more than 90 degrees clockwise from a second one 225a of the extendible arms, and a third one of the extendible arms 225c is spaced more than 90 degrees counterclockwise from the second one of the extendible arms 225a.

A self-centering linkage mechanism 245 (see FIG. 2D) is provided so that the apparatus (such as optical target 210) mounted on the clamp 200 remains centered on the vehicle spindle across the range of tire diameters encountered. The mechanism 245 comprises a plurality of gears rotatably mounted to the clamp body 220 and engaged with each other. In this embodiment, the linkage mechanism 245 comprises an orbital gear 246 rotatably mounted to the clamp body 220, and a manually rotatable worm gear 247 engaged with the orbital gear 246 for rotating the orbital gear 246. Linkage mechanism 245 further includes a plurality of link arms 248. Each link arm 248 movably connects one of the extendable arms 225a-c to the orbital gear 246 such that when the gears 246, 247 are rotated, the extendable arms 225a-c simultaneously proportionally slide relative to the clamp body 220. The linkage mechanism 245 is for moving the extendable arms 225a-c such that the gripping portions 230 of the extendible arms 225a-c engage and grip the tire tread surface 205a and tighten the clamp onto the tire 205, while the sidewall contact portions 235 of the extendible arms 225a-c contact the tire sidewall 205b.

Each link arm 248 has a first end 248a pivotably attached to the orbital gear 246 and a second end 248b pivotably attached to one of the extendible arms 250a-c such that when the orbital gear 246 is rotated by the worm gear 247, the link arms 248 cause the extendible arms 225a-c to slide relative to the clamp body 220. A knob 250 is attached to the worm gear 247 for rotating the worm gear 247, and a clutch 251 between the knob 250 and the worm gear 247 limits a torque applied to the worm gear 247 to a predetermined maximum torque when the wheel clamp 200 is tightened onto the tire 205. The linkage mechanism 245 simultaneously maintains proportional movement of each arm 250a-c as the worm gear 247 is operated using the knob 250.

Figure 2E:
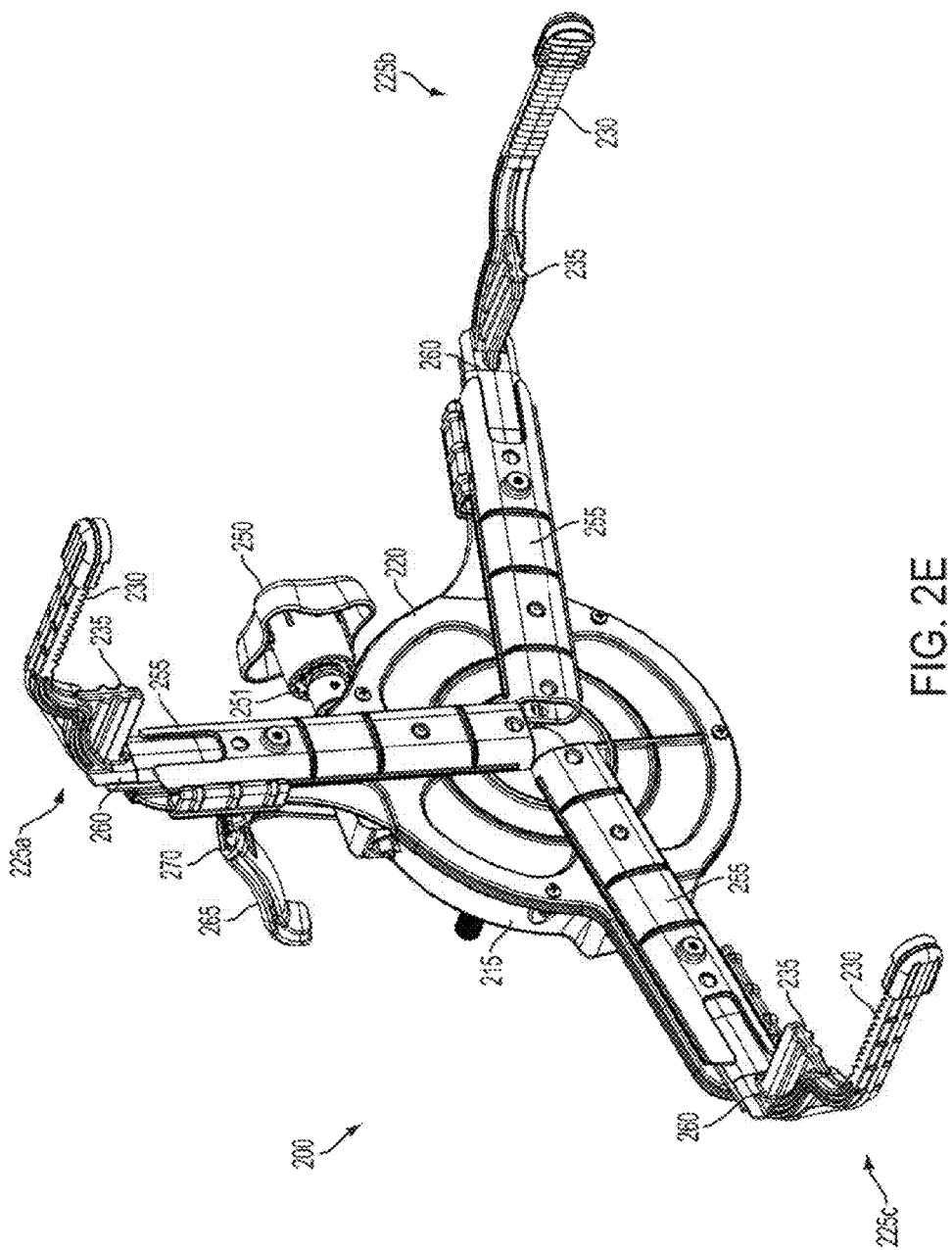
Figure 2F:
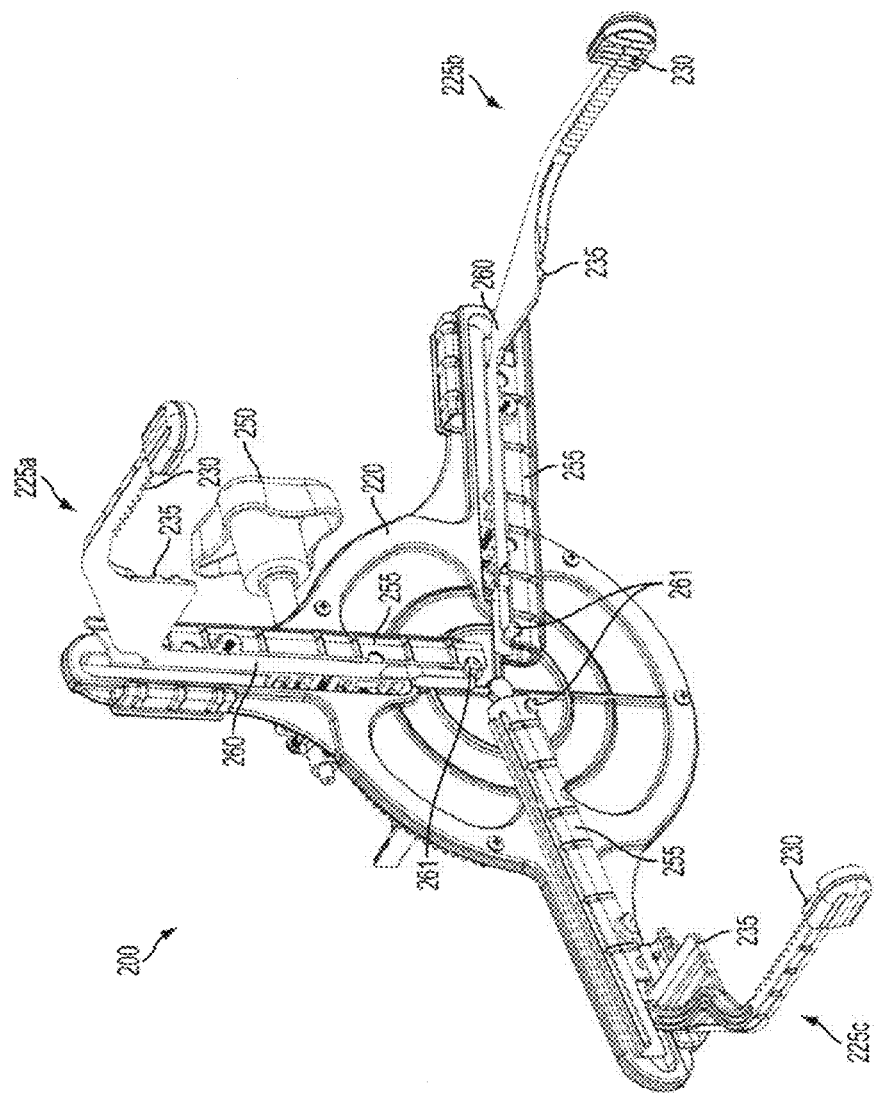
Figure 2G:
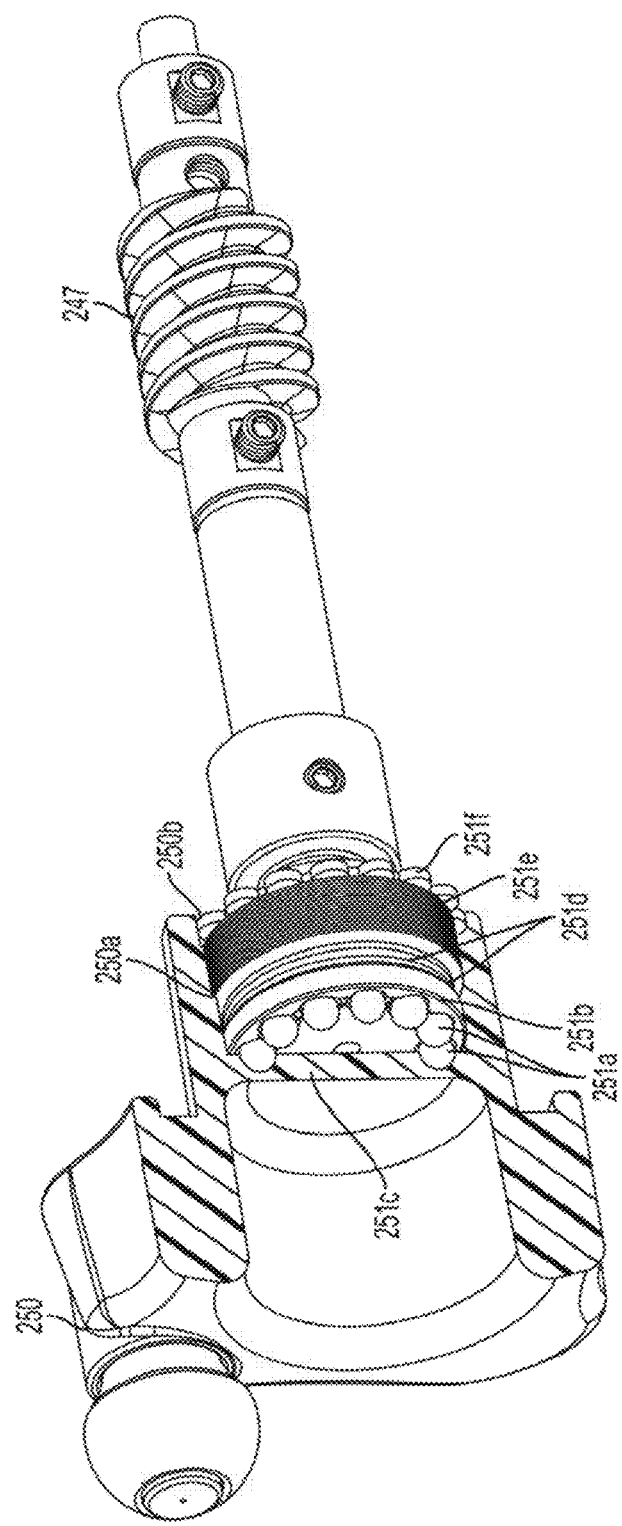
FIG. 2G is a cutaway view of a clutch mechanism of the wheel clamp of FIG. 2A.

Details of a well-known mechanism to implement the clutch 251 are shown in FIGS. 2G and 2H. Those skilled in the art will appreciate that other clutch mechanisms are also usable. A plurality of balls 251a, such as plastic balls, are captured between two plates 251b, 251c with hemispherical indentions in each. The number of indentions in each plate 251b, 251c is equal to the number of balls 251a. The two plates 251b, 251c are held together under an adjustable preset load using a set of wave washers 251d. The knob handle 250 has internal threads 250a that engage with an externally threaded part 251e that applies pressure to the wave washers 251d as it is threaded into the knob 250 during the assembly process. When the desired pressure is reached as measured with a torque wrench (not shown), a star washer 251f is pressed into the knob 250 to engage with a mating star cutout 250b in the knob 250, and a snap ring 251g holds the assembly together.

Once assembled, the knob 250 can be used to tighten the clamp 200 onto the tire 205 until the preload on the two plates 251b, 251c holding the balls 251a in place is overcome. The wave washers 251d will then depress slightly, allowing the plates 251b, 251c to slip to the next ball position while emitting an audible "click," indicating the predetermined maximum torque has been reached.

Note that since the clamp 200 and/or the target 210 are not symmetrical (due to the worm gear/knob assembly, shape of the target, etc.), in certain embodiments "left hand" and "right hand" clamps are provided that are minor images of each other. The left hand clamp assembly is for attachment to a wheel on the left side of the vehicle, and vice versa. Using left and right hand clamps, all the targets can be oriented the proper way without interference from parts of the clamp 200.

To enable the clamp 200 to be quickly attachable to the vehicle wheel given the wide range of vehicle tire outside diameters, it is not optimal to use the worm/orbital gear travel to account for the potential range of movement required. It is also undesirable to use a plurality of different length arms with the attendant problems of attaching/detaching and storage of multiple separate parts. This problem is solved in the present disclosure by providing the extendible arms 225a-c with arm supports 255 as shown in FIGS. 2E and 2F designed to be driven by the linkages 248 attached to the orbital gear 246, and main arms 260 slidably positioned within each arm support 255. The main arms 260 are locked in one of multiple positions along the arm support 255. Each main arm 260 must be locked in a similar relative position along the length of each arm support 255 to maintain the self-centering feature of the clamp.

As shown in detail in FIGS. 2D-2F, the clamp body 220 has a plurality of slots 220a, and the second ends 248b of the link arms 248 respectively engage and slide in the slots 220a. Each of the extendible arms 225a comprises one of the arm supports 255 slidably mounted to the clamp body 220 and movably attached to one of the link arms 248; and one of the main arms 260 including the gripping portion 230 and the sidewall contact portion 235 is adjustably mounted to the arm support 255 for adjusting a length of the extendible arm. The main arm 260 is slidably mounted to the arm support 255 in a telescoping manner, and further comprises a lock for maintaining a position of the main arm 260 relative to the arm support 255. The lock comprises, for example, a ball detent mechanism 261 including a spring-loaded ball between the main arm 260 and the arm support 255.

Referring again to FIGS. 2B and 2C, the wheel clamp 200 further comprises a handle 265 attached to the clamp body 220 for gripping by a user for holding the clamp 200 while the worm gear 247 is rotated via knob 250. The handle 265 comprises a level indicator 270, such as a bubble level, for indicating when the handle 265 is vertical. As best seen in FIG. 2C, the handle 265 is substantially vertical when gripped by a user. One of the extendible arms 225a is proximal the handle (e.g., about 10 degrees offset), and each of two other of the extendible arms 225b,c are offset more than 90 degrees from the one of the extendible arms 225a, measured relative to the central point C; for example, up to 120 degrees. The advantages of this arrangement are explained immediately below.

During a typical wheel alignment procedure, it is necessary to roll the vehicle through an angular displacement of up to 40 degrees in a process known as rollback. Further, it is known that the tire is deformed by the weight of the vehicle in the area where the outside diameter contacts the supporting surface. If the tire 205 is rotated 40 degrees from the position shown in FIG. 2A, the clamp extendible arms 225b-c can be close enough to the tire bulge where the tire contacts the supporting surface to cause a small but undesirable change in the position of the clamp and target assembly.

To prevent this, two options are available. While it is common to do rollback by rolling the vehicle wheels through a 40 degree rotation in one direction and then back to the original position, it is also possible to perform a "split rollback" procedure. Split rollback involves rolling the vehicle wheels, for example, 20 degrees in one direction, then 40 degrees in the opposite direction and then 20 degrees in the original direction back to the start position. Utilizing this procedure will keep the gripping portions of the extendible arms from getting near the tire contact area during rotation.

Alternatively, the clamp shown in FIG. 2C can be used so that the handle 265 is a vertical reference. Since the extendible arms 225a-c are offset by an angle; e.g., 10 degrees counterclockwise, the vehicle wheel can be rotated 40 degrees clockwise and the gripping portions 230 of the clamp 200 will not enter the tire deformation zone.

In another embodiment of the disclosed wheel clamp as shown in FIG. 3A-3E, three similarly sized drive gears transmit rotation to three crank arms pivotally connected to extendible arms that move slidably as restrained by the gear housing. Internal connecting gears transmit rotation of any drive gear such that the motion of all the drive gears is synchronized. Handles are fixed to two of the drive gears to allow an operator to rotate the drive gears and either expand or contract the extendible arms.

To provide a secure mounting when the clamp is tightened on the tire, a system is integrated into the drive gear handles that allows the handles to rotate freely as the gripper arms are moved inward but locks securely to prevent unintended loosening of the gripper arms when the handles are released. In one embodiment, the handle is fixed to the drive gear and a ratchet ring is movably connected to the handle such that it is spring loaded to engage mating ratchet teeth on the surface of the top housing. As the handles are rotated to pull the gripper arms inward, the user holds the ratchet ring away from the mating teeth on the top housing. When the user releases the handle, the ratchet ring drops down to engage the ratchet teeth on the top housing and the drive gears are locked.

Figure 3A:
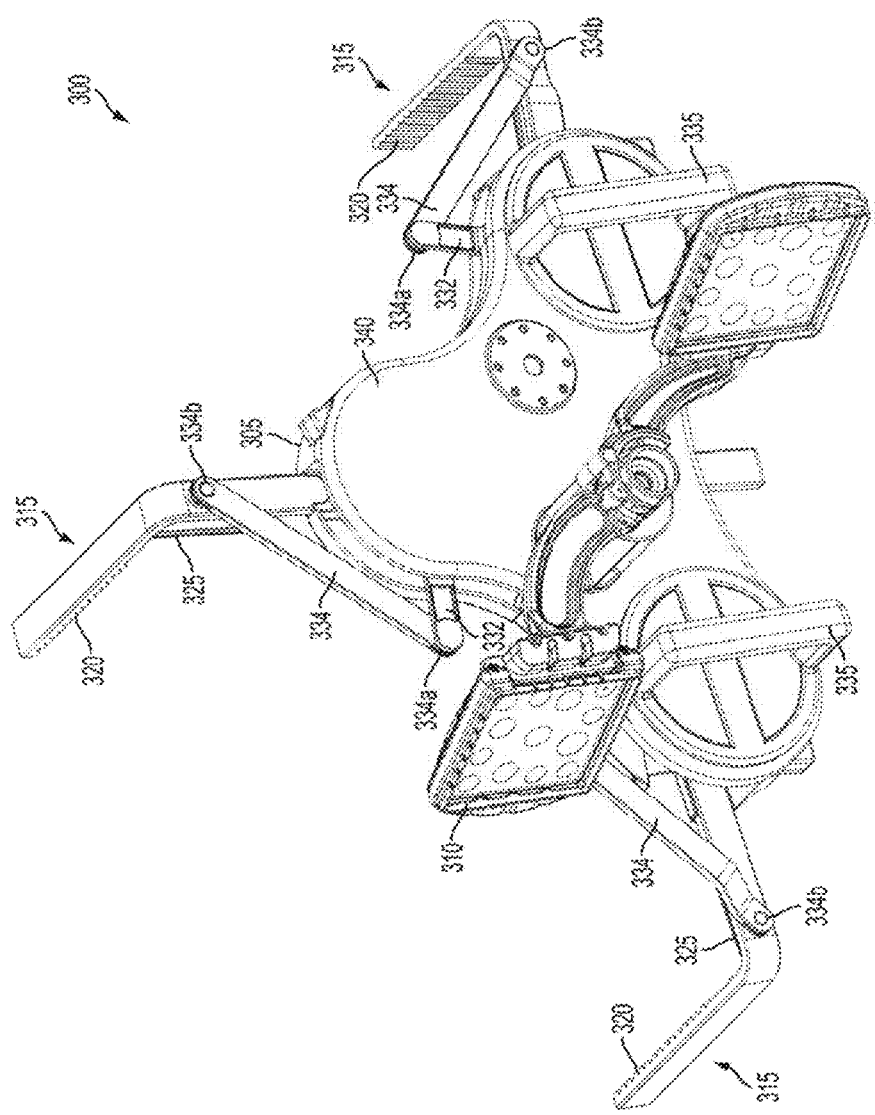
Figure 3C:
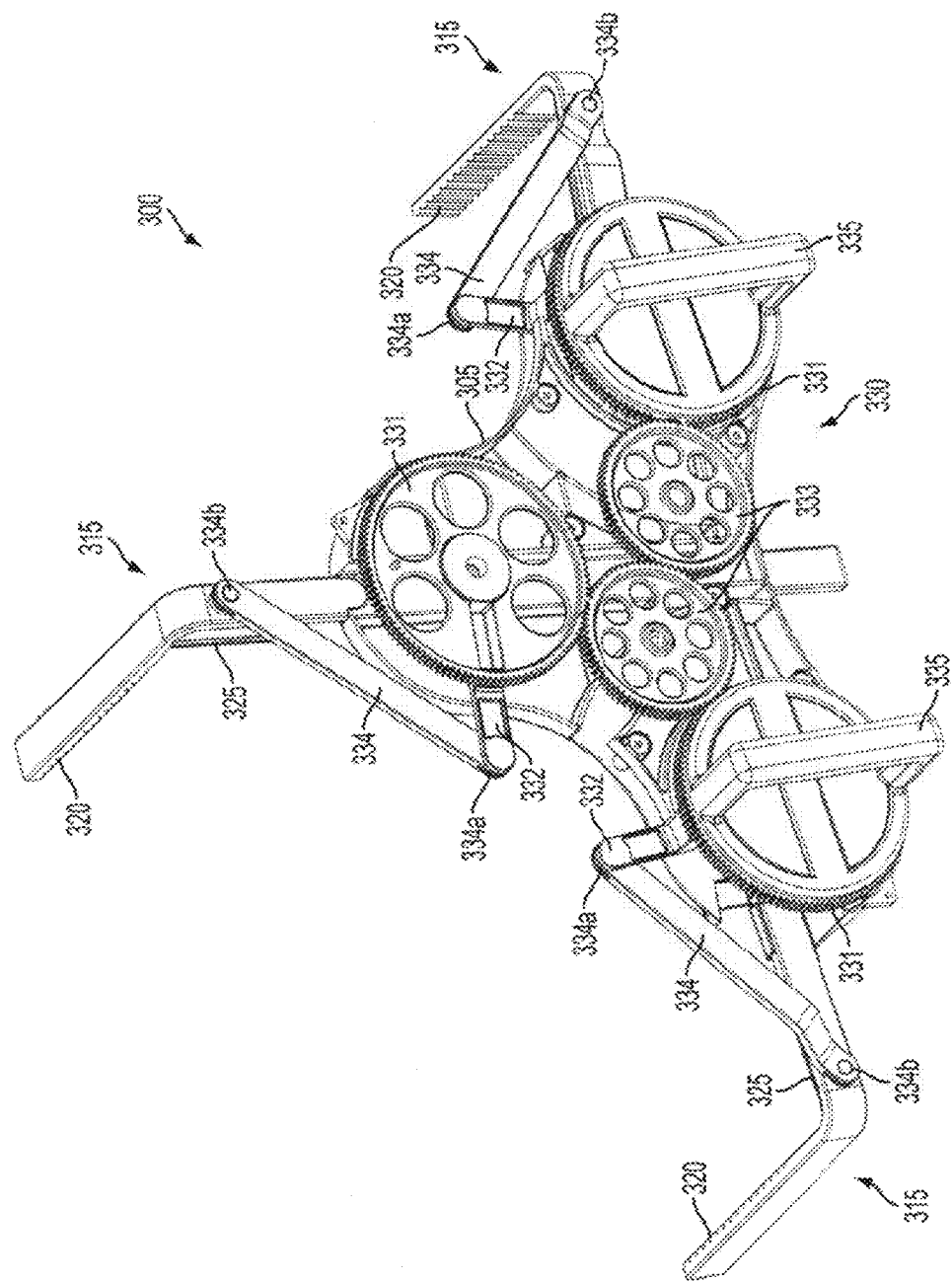
FIGS. 3C-3E are cutaway views of the wheel clamp of FIGS. 3A-B.

Referring now to FIGS. 3A-3C, a wheel clamp 300 according to this embodiment includes a clamp body 305 for supporting an apparatus used in performing a wheel alignment, such as an optical target 310. Clamp 300 is for mounting on a tire such as tire 205 shown in FIG. 2A. Three extendable arms 315 are each slidably mounted to the clamp body 305 such that they extend outward radially from a central point C, each extendable arm 315 having a gripping portion 320 for gripping the tread surface 205a of the vehicle tire 205 and a sidewall contact portion 325 for contacting the sidewall 205b of the tire 205 when the gripping portion 320 is gripping the tire tread surface 205a. As in the embodiment of FIGS. 2A-2F, the extendable arms 315 are for spacing the wheel clamp 300 away from the wheel rim 240 when the gripping portions 320 are gripping the tire tread surface 205a and the sidewall contact portions 325 are contacting the tire sidewall 205b, such that the clamp body 305 is substantially parallel to the vehicle wheel and the wheel clamp 300 has no contact with the rim 240.

A self-centering linkage mechanism 330 (see FIG. 3C) comprises three drive gears 331 rotatably mounted to the clamp body 305, each drive gear 331 associated with one of the extendible arms 315 and including a crank arm 332. A connecting gear train including two gears 333 rotatably mounted to the clamp body 305 engages all of the drive gears 331 for synchronizing motion of the drive gears 331. A pair of handles 335 is attached to two of the drive gears 331 for manually rotating the drive gears 331. The linkage mechanism 330 further includes a plurality of link arms 334. Each link arm 334 has a first end 334a pivotably attached to an end of the crank arm 332 of one of the drive gears 331, and a second end 334b pivotably attached to one of the extendible arms 315, such that when the drive gears 331 are rotated, the link arms 334 cause the extendible arms 315 to slide relative to the clamp body 305.

Thus, each link arm 334 movably connects one of the extendable arms 315 to one of the gears 331 such that when the gears 331 are rotated, the extendable arms 315 simultaneously proportionally slide relative to the clamp body 305. The linkage mechanism 330 thereby moves the extendable arms 315 such that the gripping portions 320 of the extendible arms 315 engage and grip the tire tread surface 205a and tighten the clamp 300 onto the tire 205, while the sidewall contact portions 325 of the extendible arms 315 contact the tire sidewall 205b.

Figure 3D:
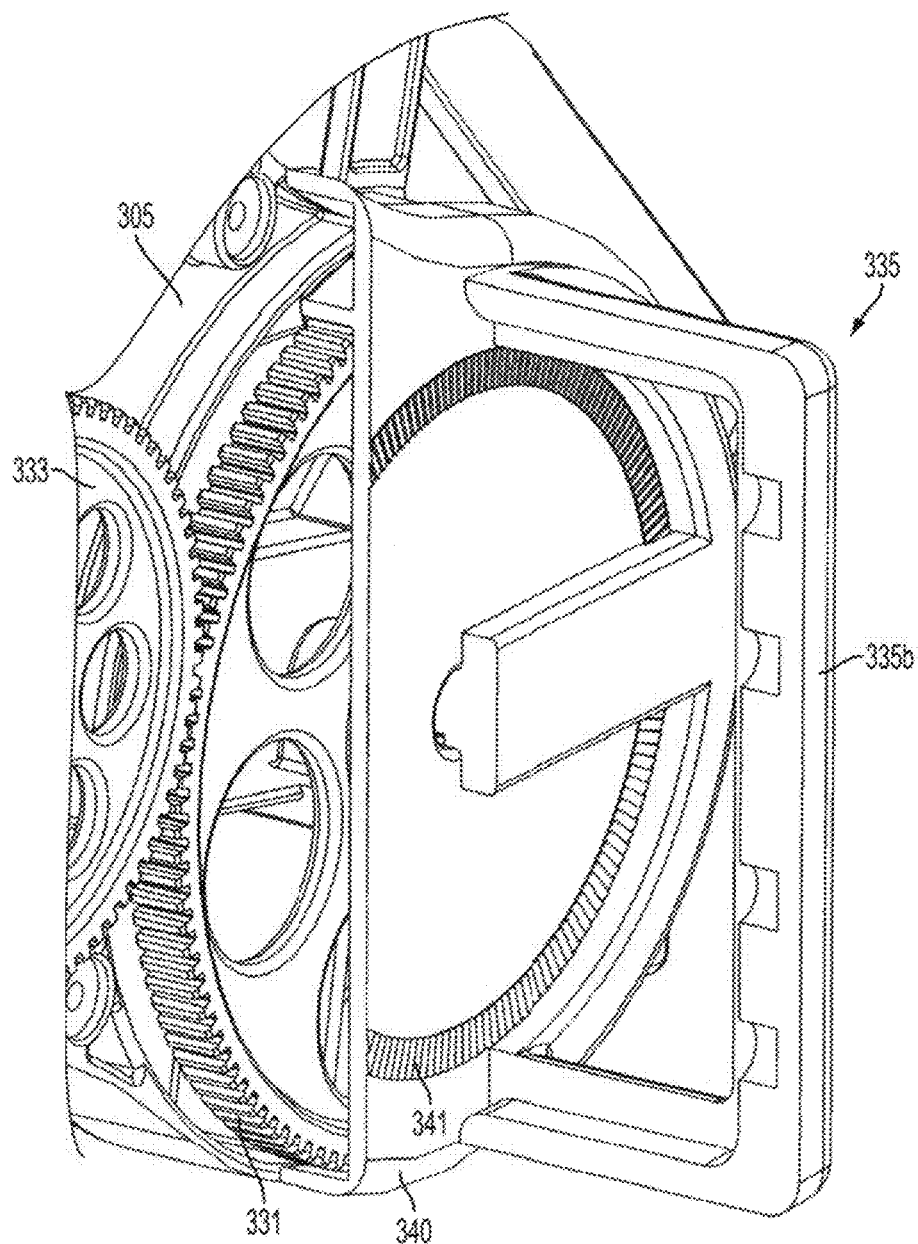
Figure 3E:
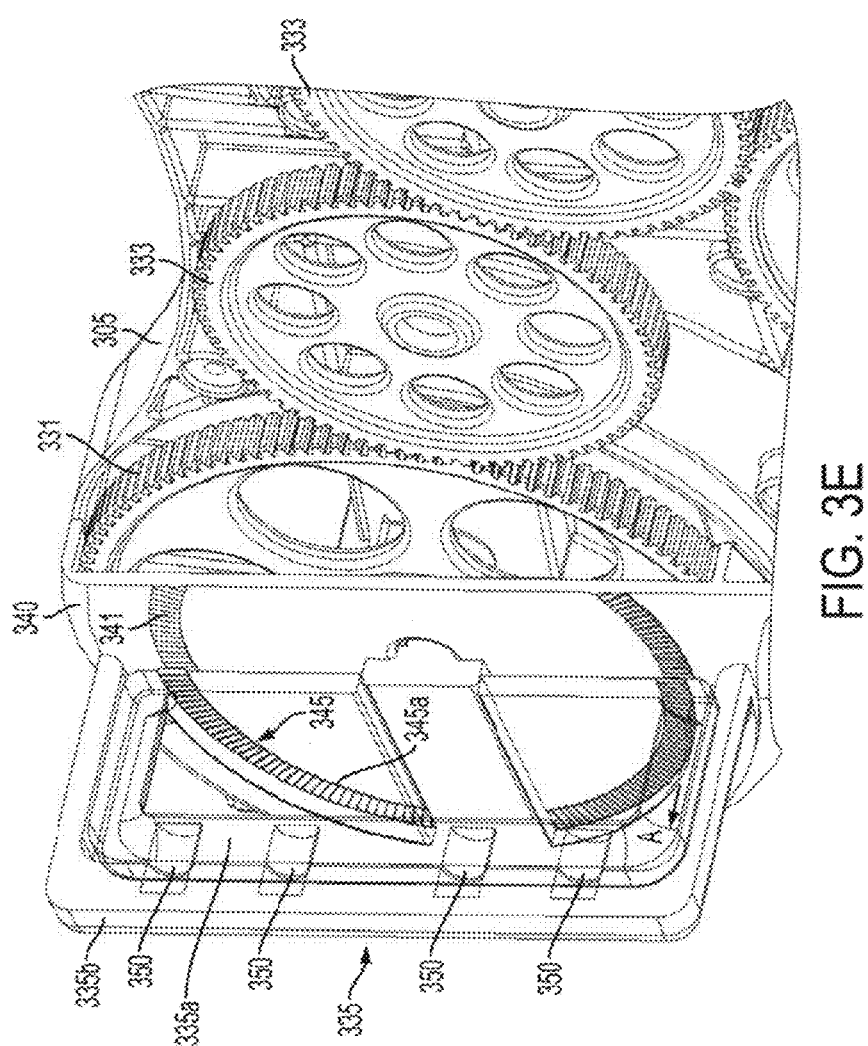

A cover 340 is attached to the clamp body 305 for covering the drive and connecting gears. Referring now to FIGS. 3D-3E, the cover 340 has a first frictional surface, such as a first set of ratchet teeth 341. A second frictional surface, such as a ratchet ring 345 having a second set of ratchet teeth 345a, is attached to one of the handles 335 for engaging the first set of ratchet teeth 341. The ratchet ring 345 is attached to the handle 335 such that the ratchet ring 345 is constantly engaged with the handle 335 and selectively engaged with the first set of ratchet teeth 341. In the embodiment shown in FIGS. 3D-3E, an inner portion 335a of the handle 335 carries the ratchet ring 345, and slides relative to an outer portion 335b of the handle 335 to selectively engage the first set of ratchet teeth 341.

When the first and second sets of ratchet teeth 341, 345 are not engaged, the handle 335 is rotatable to move the extendible arms 315 such that the gripping portions 320 of the extendable arms engage and grip the tire tread surface 205a and tighten the clamp 300 onto the tire 205, and when the first and second sets of ratchet teeth 341, 345 are engaged, the drive gears 331 are locked to prevent loosening of the clamp 300. Springs 350 are provided between the handle outer portion 335b and the second set of ratchet teeth 345a for biasing the second set of ratchet teeth 345a into engagement with the first set of ratchet teeth 341 when the handle 335 is not gripped by a user. When the handle 335 is gripped by the user, the first and second sets of ratchet teeth are not engaged. As shown in FIG. 3E, the inner portion of the handle 335a is slid in the direction of arrow A when the user grips the handle, thereby disengaging the ratchet teeth.

A further embodiment of the disclosed wheel clamp is shown in FIGS. 4A-4B. This gear-driven design has arm gears as part of three pivotable arm assemblies. The arm gears engage with a central connecting gear that synchronizes the movement of each arm with respect to the others. Gripper arms are attached at the opposite end of the arm assemblies. The gripper arms are locked in similar relative positions to the arm assemblies to maintain self-centering. The clamp is mounted by grasping the handles provided in the arm assemblies and rotating them until the clamp is secure against the vehicle tire. A ratchet device is provided to prevent loosening of the clamp after it has been pulled tight. In addition, an optional lock assist knob and mechanism are provided to apply additional clamping pressure beyond what was applied by the simple act of pushing inward and rotating the arm assemblies.

It is desirable that the target attached to the clamp remain in a constant orientation relative to the vertical arm assembly, so that the target will be visible (e.g., to aligner cameras) at any rotated angle of the horizontal arms. Position maintenance gears are therefore provided in this embodiment to link the movement of the vertical arm assembly to the target mounting spindle, so that the angular orientation is maintained constant.

A wheel clamp 400 according to this embodiment comprises a clamp body 405 and three elongated arms 410, each arm 410 having a proximal end pivotally mounted to the clamp body 405 such that the arm 410 extends outward from the clamp body 405. Clamp 400 is for mounting on a tire such as tire 205 shown in FIG. 2A. Each arm 410 has a distal end with a gripping portion 415 for gripping the tread surface 205a of the vehicle tire 205 and a sidewall contact portion 420 for contacting the sidewall 205b of the tire 205 when the gripping portion 415 is gripping the tire tread surface 205a. As in the previous embodiments of FIGS. 2A-2F and 3A-3E, the arms 410 are for spacing the wheel clamp 400 away from the wheel rim 240 when the gripping portions 415 are gripping the tire tread surface 205a and the sidewall contact portions 420 are contacting the tire sidewall 205b, such that the clamp body 405 is substantially parallel to the vehicle wheel and the wheel clamp 400 has no contact with the rim 240.

A self-centering mechanism 425 comprises an arm gear 426 attached to the proximal end of each of the arms 410 coaxial with the pivot point P of each respective arm 410, and a central connecting gear 427 engaged with all the arm gears 426 for synchronizing the movement of each arm 410 with respect to the other arms 410, such that when any of the gears are rotated, all the arms 410 simultaneously proportionally pivot relative to the clamp body 405. The self-centering mechanism 425 is for moving the arms 410 such that the gripping portions 415 engage and grip the tire tread surface 205a and tighten the clamp 400 onto the tire 205, while the sidewall contact portions 420 contact the tire sidewall 205b.

Each arm 410 comprises a handle 430 for grasping by a user such that when the user grasps two of the handles 430 and rotates two of the arms 410, the gripping portions 415 of all the arms engage and grip the tire tread surface 205a and tighten the clamp 400 onto the tire 205. A lock 435, such as a ratchet mechanism selectively engagable with the central connecting gear 427, prevents rotation of the arm gears 426 and the central connecting gear 427 to prevent loosening of the clamp 400 after it has been tightened onto the tire 205. A lock assist knob 440 is attached to one of the arm gears 426 for rotating the arm gears 426 and the central connecting gear 427 for tightening the clamp 400 onto the tire 205.

The wheel clamp 400 also has a spindle 445 rotatably mounted to the clamp body 405 for supporting an apparatus (such as an optical target 450) used in performing the wheel alignment, and a set of position maintenance gears 455 for linking the movement of one of the arms 410 to movement of the spindle 445, for maintaining an angular orientation of the spindle 445 constant relative to the one of the arms 410.

In the wheel clamps described in relation to FIGS. 2A-2H, 3A-3E and 4A-4B, the wheel clamp is tightened onto a wheel or released from the wheel by rotating a knob 250 attached to the worm gear 247, handles 335 attached to drive gears 331, or a lock assist knob 440. The knobs 250 and 440 and handles 335 can be manually rotated by an operator. However, the knobs 250 and 440 and handles 335 (or, more generally, the linkage mechanisms or assemblies 245, 330, or 425) can advantageously be designed to be rotated by a rotational actuator, such as by an electric motor, a hydraulically-driven actuator, a pneumatically-driven actuator, or the like.

Figure 5A:
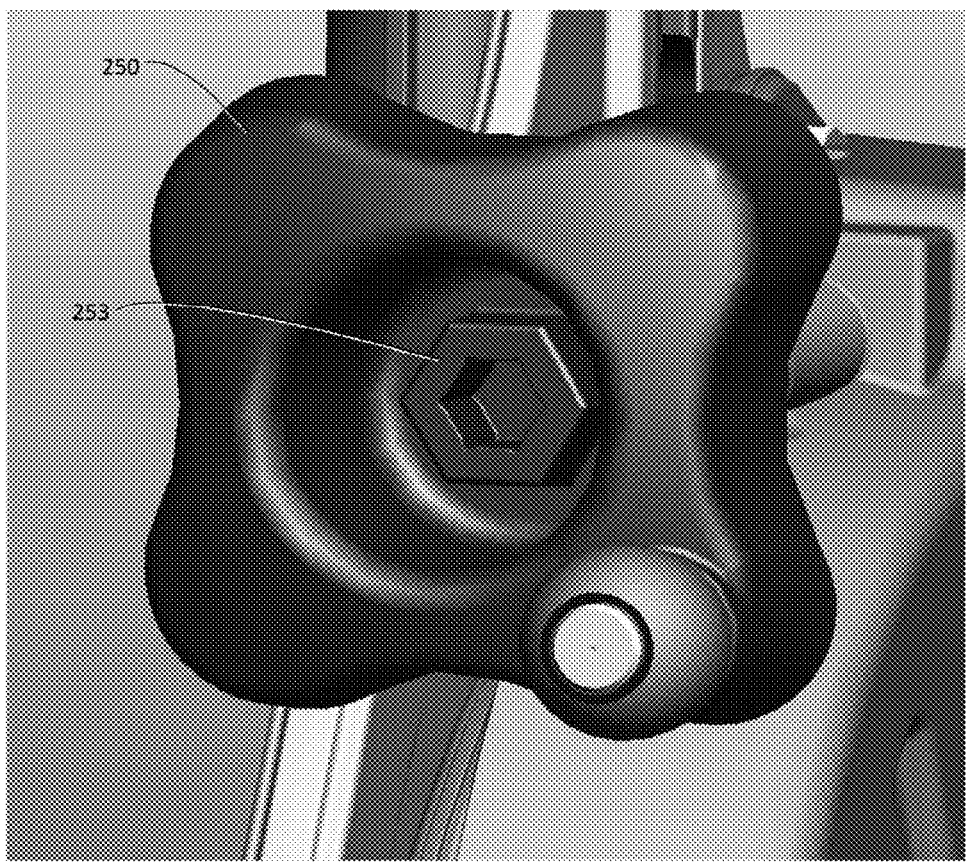
FIG. 5A is knob of a wheel clamp according to an embodiment of the present disclosure that includes an attachment interface for releasably engaging with a rotational actuator.

FIG. 5A shows an example of a knob 250 configured to be releasably engaged with a rotational actuator, such as the motor of a power screwdriver. The example of the knob 250 is illustrative, and similar modifications can be made to handles 335 and/or knob 440. The knob 250 includes an attachment interface 253 centered on a rotational axis of the knob 250 and worm gear 247 assembly. In the example illustrated in FIG. 5A, the attachment interface 253 is shaped such that it can engage a male hex tool and/or a female socket, such as a male hex tool or a female socket attached to a power screwdriver. When the attachment interface 253 is engaged with the power screwdriver, the motor of the power screwdriver can be used to rotate the knob 250 in a clockwise or counter-clockwise direction so as to attach and/or tighten the wheel clamp, or to detach and/or loosen the wheel clamp. The power screwdriver may be a battery-powered cordless power screwdriver; alternatively, the power screwdriver may be powered with electricity through a power cord, or pneumatically with a pressurized air line.

As shown, the attachment interface 253 is mechanically coupled to the worm gear 247 through the clutch 251 such that only a predetermined maximum torque can be applied on the worm gear 247 by the rotational actuator engaged with the attachment interface 253. In embodiments in which the rotational actuator includes a torque limiter system, however, the clutch 251 may optionally be omitted. Additionally, clutches of types different from the clutch 251 described in relation to FIGS. 2G and 2H can be used.

Figure 5B:
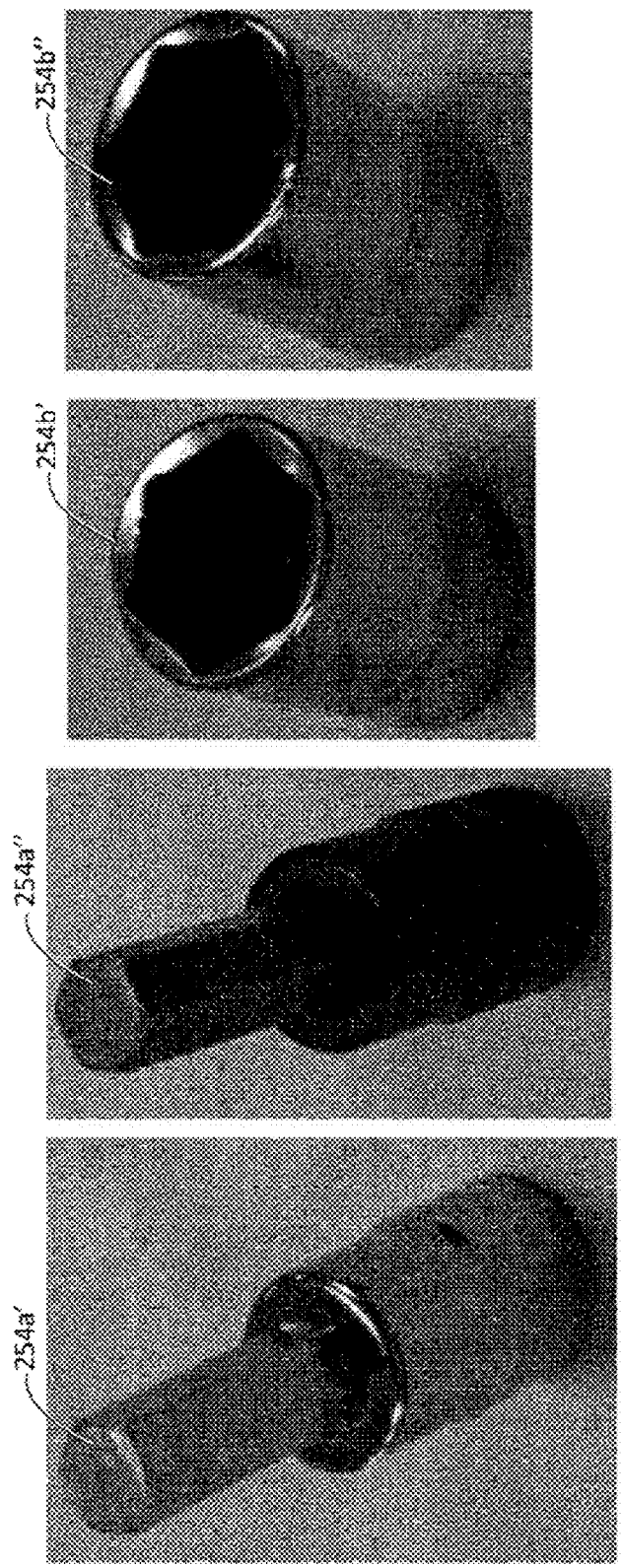
FIG. 5B shows various tools and sockets that are compatible with the attachment interface illustratively shown in FIG. 5A.

FIG. 5B shows various tools and sockets that are compatible with the attachment interface 253 illustratively shown in FIG. 5A, and that can releasably engage the attachment interface in order to enable a rotational actuator including the tool or socket to rotate the knob 250. As shown, an appropriately sized hex tool 254a' or 254a" can releasably engage the female socket of the attachment interface 253 of FIG. 5A, while an appropriately sized socket 254b' or 254b" can releasably engage the male hex tool of the attachment interface 253. The various shapes and configuration of hex tools and sockets shown in the figures represent one example of tool and socket shapes and configurations that can be used in accordance with this disclosure. However, other shapes of tools or sockets can alternatively be used.

Figure 5C:
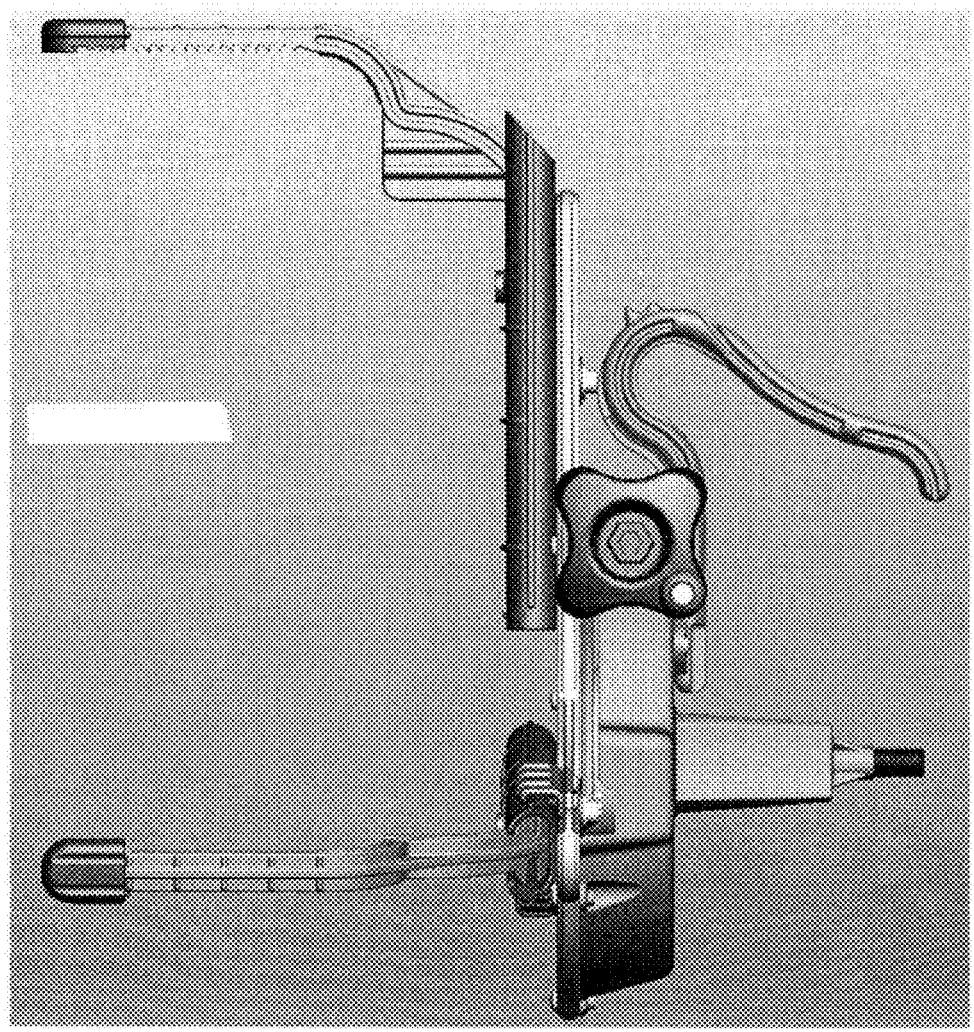

FIG. 5C shows a side view of a wheel clamp assembly 200 that is substantially similar to the clamp assembly 200 shown in and described in relation to FIGS. 2A-2H. In the wheel clamp assembly 200 of FIG. 5C, the knob 250 operative to tighten or release the clamp assembly on a wheel is shown as including an attachment interface 253 such as the attachment interface shown in FIG. 5A. The attachment interface 253 can be used to releasably engage a rotational actuator used to rotate the knob in a clockwise and/or counter-clockwise direction.

Figure 5D:
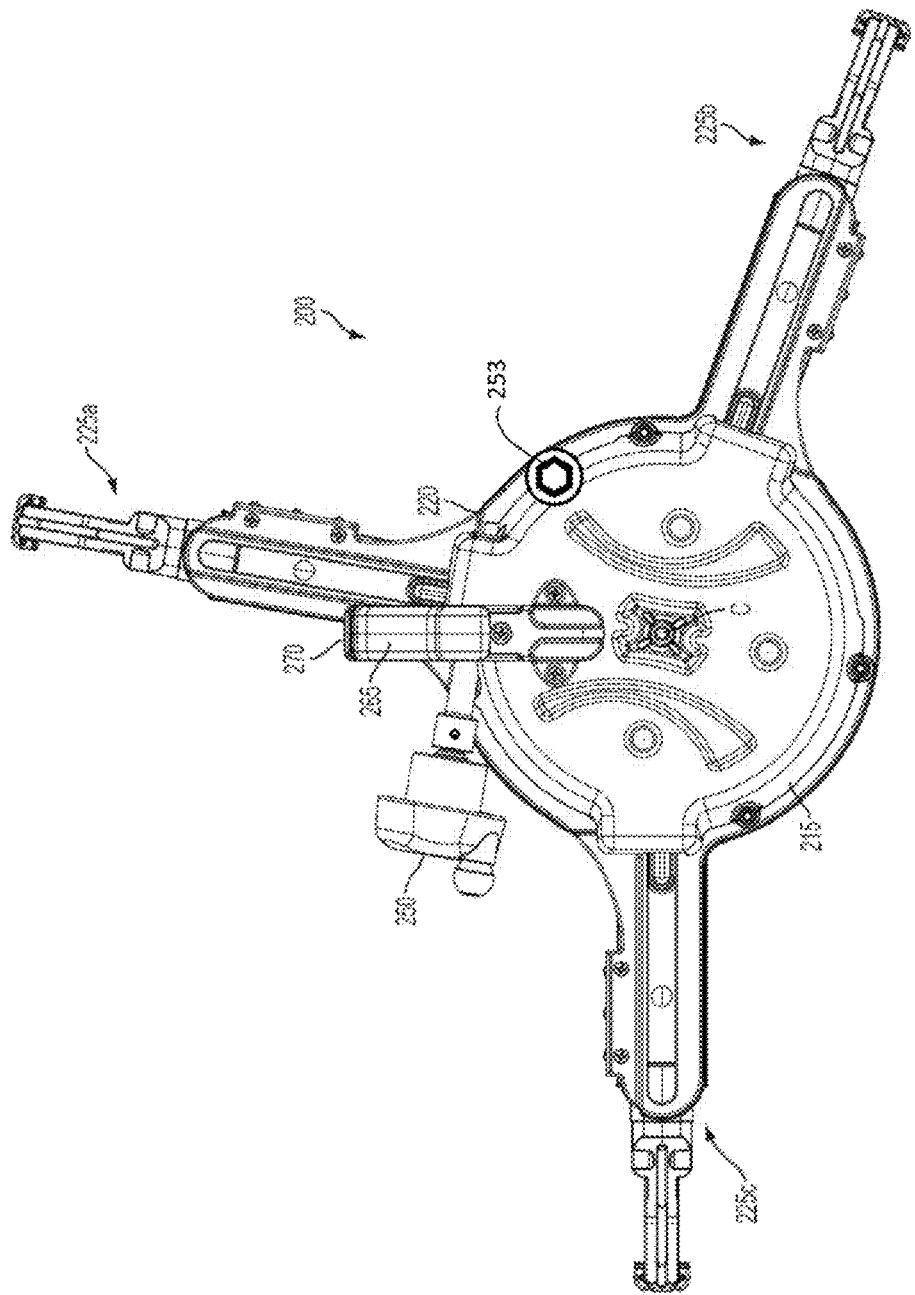

The attachment interfaces shown and described in relation to FIGS. 5A-5C are integrated on the knob 250. More generally, however, a wheel clamp assembly can include an attachment interface that is separate and distinct from a knob 250 used for manually attaching or removing the clamp. For example, as shown in FIG. 5D, an attachment interface 253 is provided that is attached to the wheel clamp body 220. The attachment interface 253 if FIG. 5D mechanically engages the linkage mechanism 245 (shown in FIG. 2D), for example through an interface gear (not shown) rotatably mounted to the clamp body 220 and engaged with the orbital gear 246 for rotating the orbital gear 246. The interface gear has the same axis of rotation as the attachment interface 253, and may be disposed below the attachment interface 253 (in the view shown in FIG. 5D) so as to engage the orbital gear 246. When the attachment interface 253 is rotated (e.g., when a rotational actuator is engages the attachment interface 253), the interface gear rotates and causes the orbital gear 246 to rotate and thereby tighten or loosen the wheel clamp.

Figure 5E:
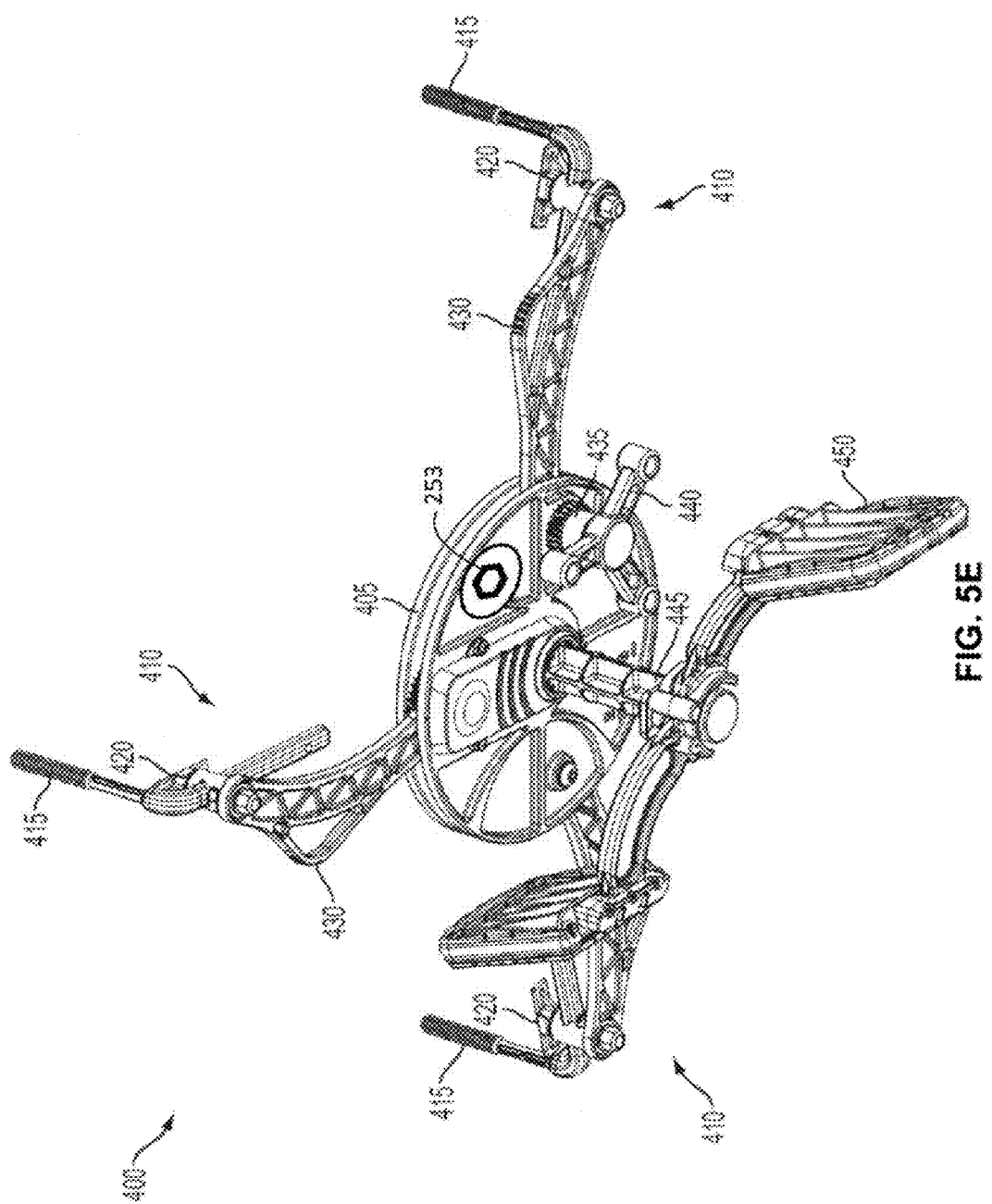

Additionally, as shown in FIGS. 5D and 5E, an attachment interface 253 is provided that is attached to the wheel clamp body 405. The attachment interface 253 is mechanically coupled to interface gear 461. In turn, interface gear 461 is engaged with central connecting gear 427 such that rotation of the attachment interface 253 causes rotation of the central connecting gear 427 via the interface gear 461. As such, rotation of the attachment interface 253 causes the wheel clamp 400 to tighten or release from a wheel.

In embodiments in which the attachment interface 253 is separate from the knob 250 or 440, a second clutch that is separate from the clutch 251 of the knob 250 can be used to ensure that only a predetermined maximum torque can be applied on the orbital gear 246 by the rotational actuator engaged with the attachment interface 253. The second clutch may be disposed in the mechanical linkage between the attachment interface 253 and the interface gear engaging the orbital gear 246, so as to ensure that only the predetermined maximum torque can be applied to the interface gear.

Figure 6A:
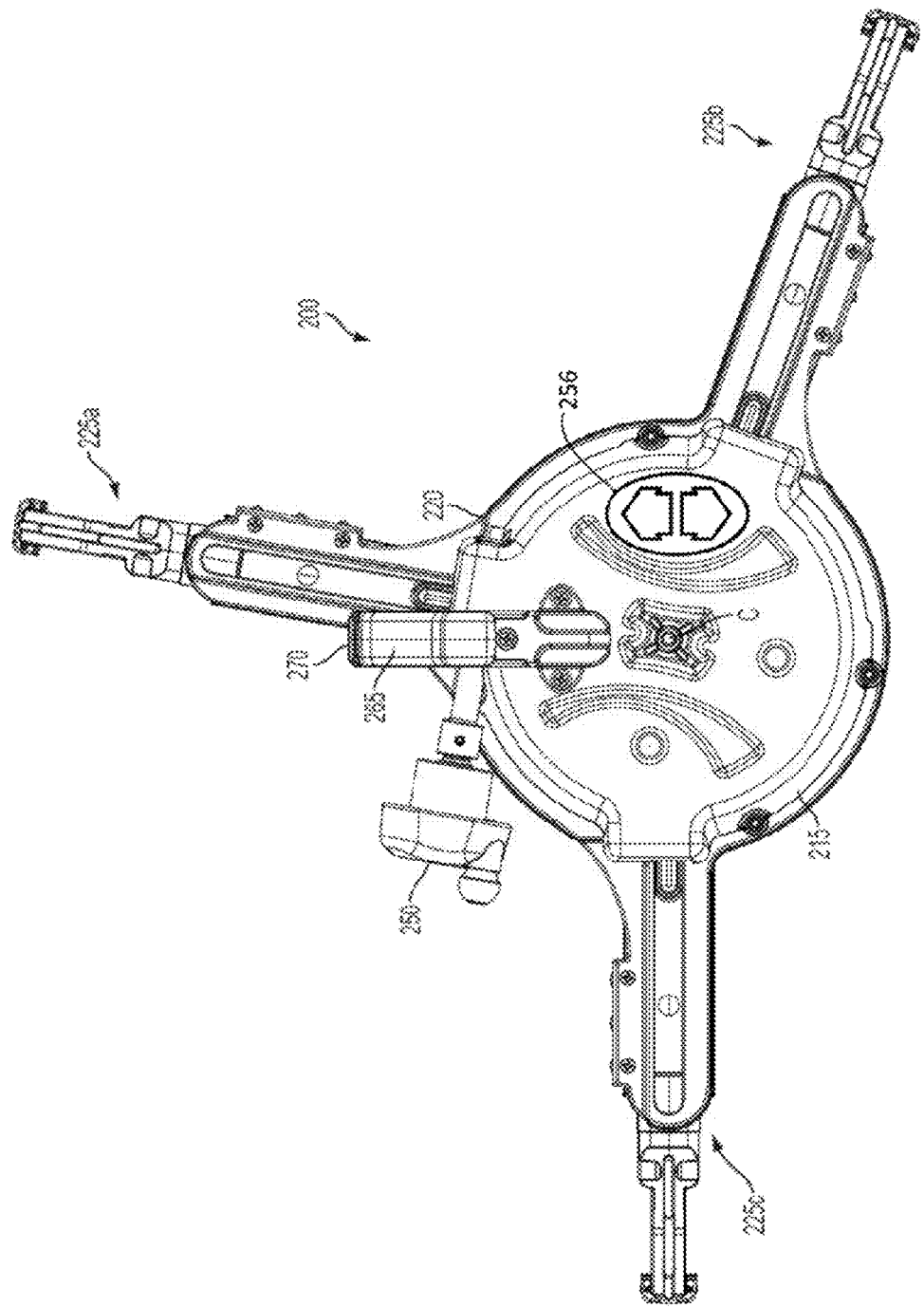
FIG. 6A is an external view of a wheel clamp according to a further embodiment of the present disclosure.
Figure 6B:
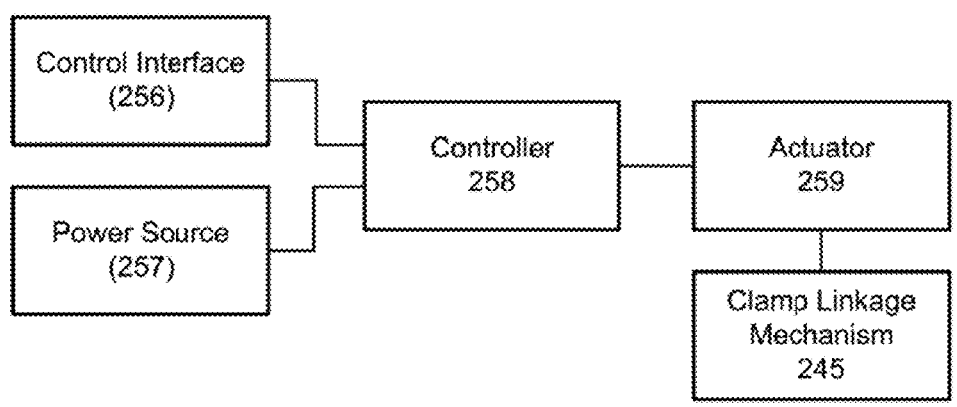
FIG. 6B is a block diagram showing components of the wheel clamp of FIG. 6A.

In a further embodiment, a mechanism is incorporated into the wheel clamp that provides power operation of the clamping action without the requirement of an external tool such as a cordless screwdriver. FIGS. 6A and 6B illustratively show embodiments of wheel clamp assemblies that include actuators for tightening the wheel clamp onto a wheel or releasing the wheel clamp from the wheel. For this purpose, the wheel clamp 200 of FIG. 6A includes a control interface 256 mounted on the clamp body 220 and configured to enable an operator of the clamp 200 to control the operation of one or more actuators of the clamp 200. The control interface 256 includes first and second buttons, shaped as up and down arrows in the illustrative embodiment of FIG. 6A, that can be used by an operator of the wheel clamp to select the direction of clamp arm actuation to tighten or loosen the clamp 200 on a wheel through operation of the actuator(s).

An operator can thus depress a first button causing the clamp arms to move in an inward direction. The operator releases the button to stop the movement of the clamp arms. A second button is provided which, when depressed, actuates the clamp to move in the opposite direction. In other embodiments, multiple position operation of each button is provided, so that the actuation rate is controllable from slow to fast. Alternatively, buttons are provided that allow infinitely variable speed control between no movement and the maximum actuation speed allowable by the mechanism in either direction (tightening or loosening). Alternative control means can be used to accomplish the tasks for the buttons described above. For example, any type of rocker or slider switch could be used. In other embodiments, remote operation of the clamp actuation mechanism is provided using a wireless remote device.

FIG. 6B is a block diagram illustratively showing components of a wheel clamp 600 including one or more actuators 259. The clamp 600 may be substantially similar to any of the wheel clamps (e.g., 200, 300, 400) shown and described herein, and may additionally include a control interface 256, a power source 257, a controller 258, and one or more actuators 259. The actuator(s) 259 are mechanically linked to the wheel clamp linkage mechanism 245, and are thus operative to tighten and/or release the wheel clamp via the linkage mechanism 245. In one example, an actuator is mechanically coupled to the orbital gear 246, one or more of the drive gears 331, the central connecting gear 427, or any other element of a linkage mechanism operative to tighten and/or loosen a wheel clamp. In the example, the actuator may be mechanically coupled to the orbital gear example via an interface gear mounted on an axle of the actuator, or coupled to the central connecting gear 427 via an interface gear 461 mounted on an axle of the actuator. The actuator(s) 259 may be rotational or linear actuators, such as an electric motor, a pneumatic or hydraulic piston, or the like.

The power source 257 provides operational power to the actuator(s) 259 via the controller 258. The operational power can be electrical power, or pneumatic, hydraulic, or other mechanical power. In one example, the power source 257 includes batteries (e.g., rechargeable batteries configured to provide electrical power an electrical actuator 259 such as an electric motor. In the one example, the power actuated wheel clamp can be cordless. Rechargeable batteries may be removable for charging, or provision can be made for charging the batteries while they remain in the clamp through a charging cable or hot shoe type connection when the clamp is stored.

Self-contained power internal to the wheel clamp is advantageous in certain situations. However, if a lighter clamp is desired, power to operate the internal clamping mechanism can be supplied from outside the clamp to save weight. In such embodiments, power delivery options include electrical power supplied to the clamp by a wired connection, pneumatic power supplied by a compressed air line, and hydraulic power supplied by a hydraulic line. In such examples, the power source 257 receives external power, such as alternative current (AC) electrical power received through a power cable or hydraulic or pneumatic power through a hydraulic or pneumatic hose or line, from an external power source. The power actuated wheel clamp may thus be corded, and may require the connection to the external source of power for powered operation.

The controller 258 receives the operational power from the power source 257, receives operator control commands from the control interface 256, and regulates the amount of operational power provided to the actuators 259 based on the control commands. In cases in which electrical power is used, the controller 258 may be a microcontroller regulating the flow of electrical power to the actuators 259 and controlling the direction of activation of the actuators 259. In hydraulic and pneumatic examples, the controller 258 regulates the flow of hydraulic or pneumatic power to the actuators 259 and controls the direction of activation of the actuators 259.

In each of the powered actuated wheel clamp embodiments, a manual clamp actuation system (e.g., knob 250) can optionally be maintained for use in the event of failure of the power system. In such an event, a handwheel or alternate method of manually operating the clamp is provided as the manual backup.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A wheel clamp for attaching to a vehicle wheel for performing a wheel alignment on the vehicle, the wheel comprising a tire and a rim, the wheel clamp comprising:
   a clamp body for supporting an apparatus used in performing the wheel alignment;
   three elongated arms, each mounted to the clamp body such that they extend outward from the clamp body, each elongated arm having a gripping portion for gripping a tread surface of the vehicle tire;
   a self-centering linkage mechanism comprising a plurality of gears rotatably mounted to the clamp body and engaged with each other, and connecting to the elongated arms such that when the gears are rotated, the elongated arms simultaneously proportionally move relative to the clamp body; and
   an attachment interface mechanically connected to the self-centering linkage mechanism and configured to be releasably engaged with a rotational actuator, such that when the rotational actuator is engaged with the attachment interface, activation of the rotational actuator causes the linkage mechanism to move the elongated arms to cause the gripping portions of the elongated arms to engage and grip the tire tread surface and tighten the clamp onto the tire.

2. The wheel clamp of claim 1, wherein the linkage mechanism comprises:
   an orbital gear rotatably mounted to the clamp body; and
   a worm gear engaged with the orbital gear and mechanically coupled to the attachment interface for rotating the orbital gear when the rotational actuator is activated.

3. The wheel clamp of claim 2, further comprising a clutch between the attachment interface and the worm gear to limit a torque applied by the rotational actuator to the worm gear to a predetermined maximum torque when the wheel clamp is tightened onto the tire.

4. The wheel clamp of claim 3, further comprising a knob attached to the worm gear for manually rotating the worm gear, wherein the attachment interface is disposed on the knob so as to be centered on a rotational axis of the knob and of the worm gear.

5. The wheel clamp of claim 1, wherein the attachment interface comprises at least one of a male hex tool and a female socket.

6. The wheel clamp of claim 5, wherein the rotational actuator releasably engages the attachment interface via a female socket or male hex tool complementary to the at least one of the male hex tool and the female socket.

7. The wheel clamp of claim 1, wherein the rotational actuator is a power screwdriver.

8. The wheel clamp of claim 7, wherein the rotational actuator is a battery-powered power screwdriver.

9. The wheel clamp of claim 1, wherein the rotational actuator is a pneumatic or hydraulic actuator.

10. A wheel clamp for attaching to a vehicle wheel for performing a wheel alignment on the vehicle, the wheel comprising a tire and a rim, the wheel clamp comprising:
- a clamp body;
- three elongated arms, each mounted to the clamp body such that they extend outward from the clamp body, each elongated arm having a gripping portion for gripping a tread surface of the vehicle tire;
- a self-centering mechanism comprising a plurality of gears rotatably mounted to the clamp body and engaged with each other, and connecting to the elongated arms such that when the gears are rotated, the elongated arms simultaneously proportionally move relative to the clamp body;
- a control interface configured to receive a command from an operator of the wheel clamp to tighten or release the wheel clamp; and
- an actuator mechanically coupled to the self-centering mechanism and configured to power the self-centering mechanism in response to the command received by the control interface to move the elongated arms such that the gripping portions of the arms engage and grip the tire tread surface and tighten the clamp onto the tire based on the operator command to tighten the wheel clamp.

11. The wheel clamp of claim 10, further comprising:
- a power source configured to provide operational power to drive the actuator; and
- a controller configured to receive the command of the operator of the wheel clamp from the control interface, to regulate the operational power provided from the power source to the actuator based on the command of the operator, and to control a direction of activation of the actuator based on the command of the operator.

12. The wheel clamp of claim 11, wherein the power source comprises a battery.

13. The wheel clamp of claim 11, wherein the actuator is an electric motor operative to rotate the plurality of gears of the self-centering mechanism.

14. The wheel clamp of claim 11, wherein the actuator is a pneumatic actuator operative to rotate the plurality of gears of the self-centering mechanism, and the power source comprises a pneumatic line for receiving compressed air.

15. The wheel clamp of claim 11, wherein the actuator is a hydraulic actuator operative to rotate the plurality of gears of the self-centering mechanism, and the power source comprises a hydraulic line for receiving compressed pressured hydraulic fluid.

16. The wheel clamp of claim 11, wherein the actuator is a rotational actuator, and a gear mounted on an axle of the rotational actuator is engaged with at least one of the plurality of gears of the self-centering mechanism.

* * * * *